United States Patent
Joshi et al.

(10) Patent No.: US 9,667,994 B2
(45) Date of Patent: May 30, 2017

(54) INTRA-CODING FOR 4:2:2 SAMPLE FORMAT IN VIDEO CODING

(71) Applicant: QUALCOMM Incorporated, San Diego, CA (US)

(72) Inventors: Rajan Laxman Joshi, San Diego, CA (US); Liwei Guo, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 343 days.

(21) Appl. No.: 14/038,536

(22) Filed: Sep. 26, 2013

(65) Prior Publication Data

US 2014/0092965 A1    Apr. 3, 2014

Related U.S. Application Data

(60) Provisional application No. 61/708,582, filed on Oct. 1, 2012.

(51) Int. Cl.
*H04N 19/70* (2014.01)
*H04N 19/593* (2014.01)
(Continued)

(52) U.S. Cl.
CPC .......... *H04N 19/593* (2014.11); *H04N 19/11* (2014.11); *H04N 19/176* (2014.11);
(Continued)

(58) Field of Classification Search
CPC .... H04N 19/186; H04N 19/176; H04N 19/61; H04N 19/105; H04N 19/11
See application file for complete search history.

(56) References Cited

U.S. PATENT DOCUMENTS 7,684,489 B2    3/2010 Johansen et al.
2002/0154886 A1* 10/2002 Sugiyama ............ H04N 9/7921
386/329

(Continued)

FOREIGN PATENT DOCUMENTS

GB         2501535 A    10/2013
JP      2010045853 A     2/2010
(Continued)

OTHER PUBLICATIONS

An, et al., "Non-CE2: Separate RQT structure for Y, U and V components", JCT-VC Meeting; MPEG Meeting; Feb. 1-10, 2012; San Jose; (Joint Collaborative Team on Video Coding of ISO/IEC JTC1/SC29/WG11 and ITU-T SG.16); URL: http://wftp3.itu.int/av-arch/jctvc-site/, No. JCTVC-H0315, XP030111342, 23 pp.
(Continued)

*Primary Examiner* — Obafemi Sosanya
(74) *Attorney, Agent, or Firm* — Shumaker & Sieffer, P.A.

(57) ABSTRACT

Systems, methods, and devices for video coding that may receive a rectangular chroma block are disclosed. The rectangular chroma block may be divided into a first square sub-block and a second square sub-block. The systems, methods, and devices may reconstruct the first square sub-block and intra-predict the second square sub-block using reference samples from the reconstructed first square sub-block.

13 Claims, 12 Drawing Sheets

(51) Int. Cl.
*H04N 19/176* (2014.01)
*H04N 19/96* (2014.01)
*H04N 19/11* (2014.01)
*H04N 19/186* (2014.01)
*H04N 19/645* (2014.01)
*H04N 19/105* (2014.01)

(52) U.S. Cl.
CPC ......... *H04N 19/186* (2014.11); *H04N 19/645* (2014.11); *H04N 19/70* (2014.11); *H04N 19/96* (2014.11)

(56) References Cited

U.S. PATENT DOCUMENTS

| | | | |
|---|---|---|---|
| 2005/0271288 A1 | 12/2005 | Suzuki et al. | |
| 2008/0170615 A1* | 7/2008 | Sekiguchi | H04N 19/70 375/240.14 |
| 2011/0249721 A1 | 10/2011 | Karczewicz et al. | |
| 2012/0114034 A1 | 5/2012 | Huang et al. | |
| 2012/0183080 A1* | 7/2012 | Zhou | H04N 19/61 375/240.26 |
| 2012/0230417 A1 | 9/2012 | Sole et al. | |
| 2012/0257677 A1* | 10/2012 | Bankoski | H04N 19/105 375/240.16 |
| 2012/0287995 A1 | 11/2012 | Budagavi | |
| 2013/0003855 A1* | 1/2013 | Park | H04N 19/119 375/240.18 |
| 2013/0039422 A1 | 2/2013 | Kirchhoffer et al. | |
| 2013/0107970 A1 | 5/2013 | Wang et al. | |
| 2013/0114692 A1 | 5/2013 | Sze et al. | |
| 2013/0114698 A1 | 5/2013 | Lou et al. | |
| 2013/0223518 A1 | 8/2013 | Shibahara et al. | |
| 2014/0092983 A1 | 4/2014 | Joshi et al. | |
| 2015/0304662 A1* | 10/2015 | Liu | H04N 19/176 375/240.13 |

FOREIGN PATENT DOCUMENTS

| | | |
|---|---|---|
| KR | 20080066559 A | 7/2008 |
| WO | 2011019383 A2 | 2/2011 |
| WO | 2011087271 A2 | 7/2011 |
| WO | 2013023518 A1 | 2/2013 |
| WO | 2013040287 A1 | 3/2013 |

OTHER PUBLICATIONS

Bjontegaard G., et al., "Definition of New Coding Elements from Telenor", 10. VCEG Meeting, May 16, 2000-May 19, 2000, Osaka, JP, (Video Codingexperts Group of ITU-T 56.16), No. Q15-J-28, May 9, 2000 (May 9, 2000), pp. 1-25, XP030003057, ISSN: 0000-0466.
Bross et al., "High efficiency video coding (HEVC) text specification draft 10 (for FDIS & Last Call)," 12th Meeting: Geneva, CH, Jan. 14-23, 2013, JCTVC-L1003_v34, 310 pp.
Bross et al., "High efficiency video coding (HEVC) text specification draft 7," 9th Meeting: Geneva, CH, Apr. 27-May 7, 2012, JCTVC-I1003_d2, 290 pp.
Bross et al., "High efficiency video coding (HEVC) text specification draft 8," 10th Meeting: Stockholm, SE, Jul. 11-20, 2012, JCTVC-J1003_d7, 261 pp.
Bross B., et al., "WD5: Working Draft 5 of High-Efficiency Video Coding (JCTVC-G1103_d6)", Joint Collaborative Team on Video Coding (JCT-VC) of ITU-T SG16 WP3 and ISO/IEC JTC1/SC29/WG11 7th Meeting: Geneva, CH, Nov. 21-30, 2011, 203 pp., [uploaded in parts].
Bross et al., "High efficiency video coding (HEVC) text specification draft 6," 8th Meeting: San Jose, CA, USA, Feb. 1-10, 2012, JCTVC-H1003, 259 pp.
Bross et al., "High efficiency video coding (HEVC) text specification draft 9," 11th Meeting: Shanghai, CN, Oct. 10-19, 2012, JCTVC-K1003_v7, 290 pp.
Bross et al., "WD4: Working Draft 4 of High-Efficiency Video Coding," 6th Meeting: JCTVC-F803_d2, Torino, IT, Jul. 14-22, 2011, 226 pp.
Bross et al., "WD5: Working Draft 5 of High-Efficiency Video Coding," 7th Meeting: Geneva, Switzerland, Nov. 21-30, 2011, JCTVC-G1103_d2, 214 pp.
Guo, et al., "Non-Square Transform for 2NxN and Nx2N Motion Partitions", MPEG Meeting; Jun. 18-22, 2011; Torino; (Motion Picture Expert Group OR ISO/IEC JTC1/SC29/WG11) No. m20996, SP030049559, 9 pp.
HM7: High Efficiency Video Coding (HEVC) Test Model 7 Encoder Description: "High Efficiency Video Coding (HEVC) Test Model 7 (HM 7) Encoder Description", JCT-VC Meeting; MPEG Meeting; Apr. 27-May 5, 2012; Geneva; (Joint Collaborative Team on Video Coding of ISO/IEC JTC1/SC29/WG11 and ITU-T SG.16 ); URL: http://wftp3.itu.int/av-arch/jctvc-site/, No. JCTVC-I1002, XP030112372, 42 pp.
International Preliminary Report on Patentability from International Application No. PCT/US2013/062143, dated Jan. 7, 2015, 10 pp.
International Search Report and Written Opinion from International Application No. PCT/US2013/062143, dated Feb. 3, 2014, 15 pp.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
ITU-T H.265, Series H: Audiovisual and Multimedia Systems, Infrastructure of audiovisual services—Coding of moving video, High efficiency video coding, The International Telecommunication Union, Apr. 2013, 317 pages.
Lee, et al., "Improved side information signaling for quad-tree based transform structure of TMuC", MPEG Meeting; Guangzhou; (Motion Picture Expert Group or ISO/IEC JTC1/SC29/WG11), No. M18091, Oct. 7-15, 2010, XP030046681, 5 pp.
Silcock, et al., "AHG12: Extension of HM7 to Support Additional Chroma Formats", 10. JCT-VC Meeting; 101. MPEG Meeting; Jul. 11-20, 2012; Stockholm; (Joint Collaborative Team on Video Coding of ISO/IEC JTC1/SC29/WG11 and ITU-T SG.16); No. JCTVC-J0191, XP030112553, 16 pp.
Viscito: "Chroma Intra Prediction Text Description", JVT Meeting; MPEG Meeting; Dec. 9-13, 2012; Awaji, JP; (Joint Video Team of ISO/IEC JTC1/SC29/WG11 and ITU-T SG.16 ), No. JVT-F026r1, XP030005596, 3 pp.
Wiegand, et al., "BoG report: residual quadtree structure", MPEG Meeting; Oct. 7-15, 2010, Guangzhou; (Motion Picture Expert Group or ISO/IEC JTC1/SC29/WG11), No. M18590, XP030047180, 17 pp.
Wiegand et al., "WD1: Working Draft 1 of High-Efficiency Video Coding", JCTVC-C403, 3rd Meeting: Guangzhou, CN, Oct. 7-15, 2010, 137 pp.
Wiegand et al., "WD2: Working Draft 2 of High-Efficiency Video Coding," JCTVC-D503, 4th Meeting: Daegu, KR, Jan. 20-28, 2011, 153 pp.
Wiegand et al., "WD3: Working Draft 3 of High-Efficiency Video Coding," Document JCTVC-E603, 5th Meeting: Geneva, CH, Mar. 16-23, 2011, 193 pp.
Zhou, et al., "Evaluation Results on Residual Quad Tree (RQT)", MPEG Meeting, Jan. 20-28, 2011 Daegu, (Motion Picture Expert Group or ISO/IEC JTCI/SC29/WG11), No. m18807, XP030047377, 7 pp.
Second Written Opinion from International Application No. PCT/US2013/062143, dated Oct. 9, 2014, 7 pp.
ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.
Bross, et al., "High efficiency video coding (HEVC) text specification draft 8," Jul. 11-20, 2012, (Joint Collaborative Team on Video Coding (JCT-VC) of ITU-T SG16 WP3 and ISO/IEC JTC1/SC29/WG11); No. JCTVC-J1003_d7, Version 8, Jul. 28, 2012, 261 pp.
Flynn, et al., "High Efficiency Video Coding (HEVC) Range Extensions text specification: Draft 4," Apr. 18-26, 2013, (Joint

(56) References Cited

OTHER PUBLICATIONS

Collaborative Team on Video Coding (JCT-VC) of ITU-T SG16 WP3 and ISO/IEC JTC1/SC29/WG11); No. JCTVC-N1005_v1, 332 pp.

* cited by examiner

4:2:0 sample format

4:2:2 sample format

4:4:4 sample format

16x16 CU with 4:2:2 Sample Format

○ Luma Sample
⊗ Chroma Samples

Quad-tree decomposition of CU

Level diagram of quad-tree decomposition

Non-split block case

Square TU partition

INTRA-CODING FOR 4:2:2 SAMPLE FORMAT IN VIDEO CODING

This application claims the benefit of U.S. Provisional Application No. 61/708,582, filed Oct. 1, 2012, which is hereby incorporated by reference in its entirety.

TECHNICAL FIELD

This disclosure relates to video coding, and more particularly to techniques related to partitioning of residual data.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may be encoded using spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to the transform coefficients to achieve further compression.

SUMMARY

This disclosure relates to techniques for transform unit partitioning for chroma components in a video coding process using a color sample format, such as 4:2:2, that produces rectangular chroma blocks. The techniques may include splitting rectangular chroma blocks into square sub-blocks, permitting square transforms to be used for the residual data in the chroma blocks. In some examples, the techniques may include processing respective coded block flags (CBF's) for the square sub-blocks that indicate the presence or absence of non-zero transform coefficients in the sub-blocks. The techniques also or alternatively may include, in some examples, intra coding samples corresponding to one square sub-block, e.g., a bottom square sub-block, of a rectangular chroma block based on reconstructed samples obtained from intra-coding the other square sub-block, e.g., a top square sub-block.

In one example, the disclosure describes a method of decoding video data, the method including receiving a rectangular chroma block, wherein the rectangular chroma block is divided into a first square sub-block and a second square sub-block, reconstructing the first square sub-block, and intra-predicting the second square sub-block using reference samples from the reconstructed first square sub-block.

In another example, the disclosure describes a method of encoding video data, the method including receiving a rectangular chroma block, wherein the rectangular chroma block is divided into a first square sub-block and a second square sub-block, reconstructing the first square sub-block, and intra-predicting the second square sub-block using reference samples from the reconstructed first square sub-block.

In another example, the disclosure describes an apparatus for encoding video data including one or more processors configured to receive a rectangular chroma block, wherein the rectangular chroma block is divided into a first square sub-block and a second square sub-block, reconstruct the first square sub-block, and intra-predict the second square sub-block using reference samples from the reconstructed first square sub-block.

In another example, the disclosure describes an apparatus for decoding video data including means for receiving a rectangular chroma block, wherein the rectangular chroma block is divided into a first square sub-block and a second square sub-block, means for reconstructing the first square sub-block, and means for intra-predicting the second square sub-block using reference samples from the reconstructed first square sub-block.

In another example, the disclosure describes a computer-readable storage medium. The computer-readable storage medium having stored thereon instructions that upon execution by one or more processors cause the one or more processors to receive a rectangular chroma block, wherein the rectangular chroma block is divided into a first square sub-block and a second square sub-block, reconstruct the first square sub-block; and intra-predict the second square sub-block using reference samples from the reconstructed first square sub-block.

The details of one or more examples are set forth in the accompanying drawings and the description below. Other features, objects, and advantages will be apparent from the description and drawings, and from the claims.

DETAILED DESCRIPTION

Figure 1:
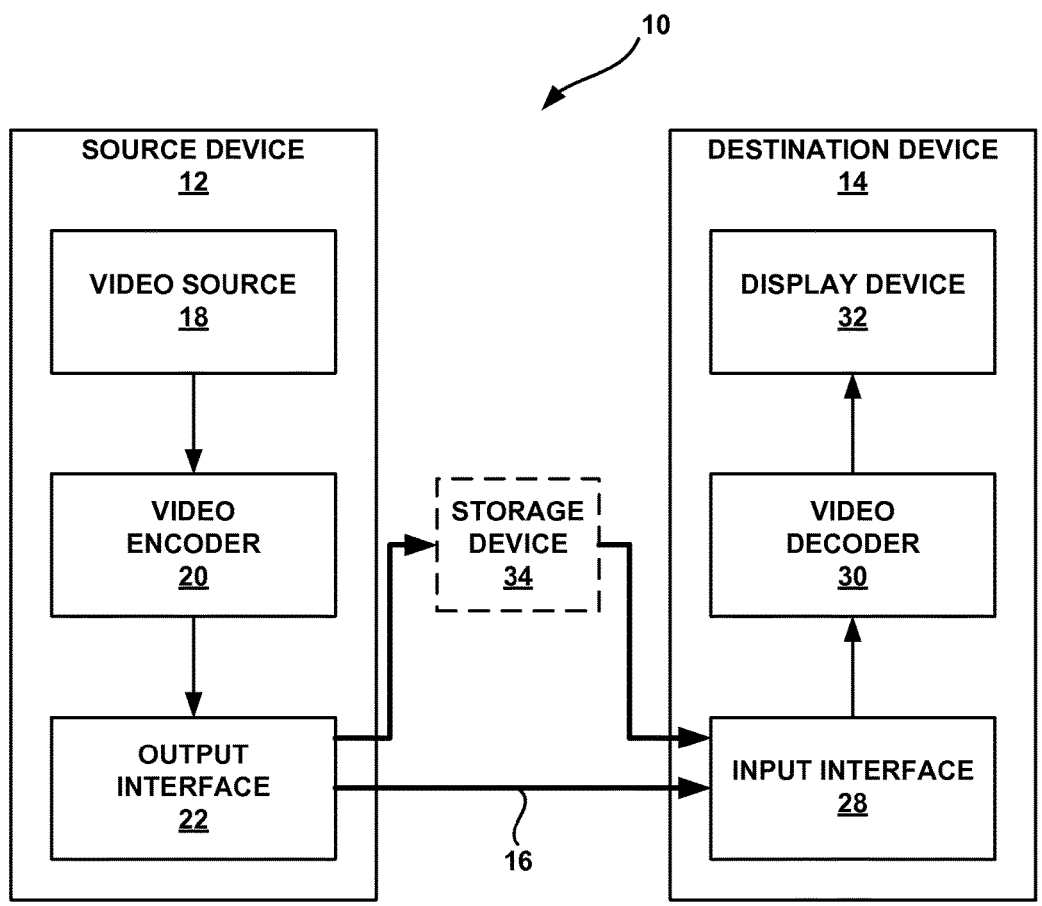
FIG. 1 is a block diagram illustrating an example video encoding and decoding system that may utilize the techniques described in this disclosure.

According to some video coding standards, a coding unit (CU), including its luma component and its chroma components, may share the same quadtree decomposition structure for transform unit (TU) partitioning. Under different color sampling formats, the corresponding chroma component blocks may have different sizes and shapes than the luma block. A final version of the High Efficiency Video Coding (HEVC) standard may use the 4:2:0 format. The final version of the HEVC standard, when combined with an example of HEVC Range Extensions being considered, may include other formats, such as 4:2:2, for example. For the HEVC Range Extensions being considered, when using 4:2:2: format, for example, not all different sizes and shapes of transforms that may result from TU partitioning are defined and available to use for the chroma component blocks. To permit the use of square transforms, rectangular blocks of transform coefficients for a chroma component may be split into square sub-blocks, as described in this disclosure. For example, a rectangular chroma block may have a top square sub-block and a bottom square sub-block.

In some examples, the present application is related to coding using color formats such as 4:2:2 and 4:4:4 color subsampling. For example, one example provides for the use of square transforms for a 4:2:2 color sampling mode in HEVC.

A recent draft of the HEVC standard, referred to as "HEVC Working Draft 10" or "WD10," is described in document JCTVC-L1003v34, Bross et al., "High efficiency video coding (HEVC) text specification draft 10 (for FDIS & Last Call)," Joint Collaborative Team on Video Coding (JCT-VC) of ITU-T SG16 WP3 and ISO/IEC JTC1/SC29/WG11, 12th Meeting: Geneva, CH, 14-23 Jan., 2013, which, as of Jun. 6, 2013, is downloadable from: http://phenix.int-evry.fr/jct/doc_end_user/documents/12_Geneva/wg11/JCTVC-L1003-v34.zip.

Another recent working Draft (WD) of HEVC, referred to as "HEVC Working Draft 6" or "WD6," is described in document JCTVC-H1003, Bross et al., "High-Efficiency Video Coding (HEVC) text specification draft 6," Joint Collaborative Team on Video Coding (JCT-VC) of ITU-T SG16 WP3 and ISO/IEC JTC1/SC29/WG11, 8th Meeting: San Jose, Calif., USA, February 2012, which as of Sep. 24, 2012, is downloadable from: http://phenix.int-evry.fr/jct/doc_end_user/documents/8 San%20Jose/wg11/JCTVC-H1003-v22.zip.

Another recent working Draft (WD) of HEVC, referred to as "HEVC Working Draft 8" or "WD8," is described in document JCTVC-J1003, Bross et al., "High-Efficiency Video Coding (HEVC) text specification draft 8," Joint Collaborative Team on Video Coding (JCT-VC) of ITU-T SG16 WP3 and ISO/IEC JTC1/SC29/WG11, 10th Meeting: Stockholm, SE, 11-20 Jul. 2012, which as of Sep. 24, 2012, is downloadable from: http://phenix.int-evry.fr/jct/doc_end_user/documents/10_Stockholm/wg11/JCTVC-J1003-v8.zip.

HEVC Range Extensions are described in document JCTVC-N1005_v3, Flynn et al., "High Efficiency Video Coding (HEVC) Range Extensions text specification: Draft 4," Joint Collaborative Team on Video Coding (JCT-VC) of ITU-T SG16 WP3 and ISO/IEC JTC1/SC29/WG11, 13th Meeting: Incheon, KR, 18-26 Apr. 2013, which, as of Sep. 22, 2013, is downloadable from: http://phenix.it-sudparis.eu/jct/doc_end_user/current_document.php?id=8139.

JCT-VC is considering a new profile for 4:2:2 and 4:4:4 color formats as part of the HEVC Range Extensions. For 4:2:2 format, the chroma components are downsampled by a factor of 2 in the horizontal direction compared with the luma component. There is no downsampling in the vertical direction.

In accordance with HEVC, frames may be divided into largest coding units (LCUs), which may comprise, for example, 32×32 pixel blocks or 64×64 pixel blocks, or blocks of other sizes. In general, LCUs may be partitioned into sub-coding units (sub-CUs), each of which may be further partitioned. In general, the term coding unit (CU) may refer to an LCU or any sub-CU thereof (e.g., a sub-CU of an LCU or a sub-CU of another sub-CU). CUs may be partitioned into four square, non-overlapping blocks. An LCU may correspond to a quadtree data structure that includes one or more nodes, where a root node of the quadtree corresponds to the LCU itself and other nodes correspond to sub-CUs of the LCU. An unpartitioned CU generally corresponds to a leaf node of the quadtree (that is, a node of the quadtree that does not have any child nodes). Accordingly, an unpartitioned CU may be referred to as a leaf-node CU. Leaf node CUs generally include one or more prediction units (PUs) that describe how data for the CU is predicted, and one or more transform units (TUs) which correspond to residual data, that is, pixel-by-pixel differences between predicted data for the CU and original data for the CU.

A leaf node for an unpartitioned CU may include information indicating prediction modes for PUs of the CU. In some examples, a residual quadtree (RQT) (also referred to as a transform unit (TU) quadtree) may be provided for leaf-node CUs. The residual quadtree may also include a root node, and one or more leaf nodes. The RQT may include information, such as information indicating prediction modes and/or other prediction information for TUs corresponding to a portion of the corresponding leaf node CU. In any case, information for a CU may indicate prediction modes for one or more portions of the CU.

Mode information provided in the RQT may indicate a particular type of intra-prediction mode. For example, the information provided in the RQT may indicate whether a DC prediction mode is used, or whether a directional intra-prediction mode is used. In the DC prediction mode, values for neighboring pixels of previously coded blocks may be aggregated and used to form predicted values for pixels of the current CU. In directional prediction modes, values for neighboring pixels of previously coded blocks may be applied in a particular direction to form predicted values for pixels of the current CU.

In general, the design of HEVC transform coefficient coding does not support the case in which all transform coefficients of a transform unit (TU) are zero. Accordingly, in HEVC, typically a coded block flag (CBF) is used to signal the presence or absence of non-zero coefficients in a TU. Some examples of this disclosure relate to sending and/or receiving, or encoding and/or decoding, a respective CBF for each of two square chroma sub-blocks of a rectangular chroma block directly, e.g., without sending a CBF flag for the rectangular chroma block.

For example, video data may be coded by splitting a rectangular chroma block, e.g., at a quadtree leaf, into first and second square sub-blocks, or obtaining a rectangular chroma block that includes first and second square sub-blocks. The first and second square sub-blocks may be, for example, a top square sub-block and a bottom square sub-block of a rectangular block. A first CBF may be coded for the first square sub-block to indicate whether the first square sub-block includes at least one nonzero transform coefficient. A second CBF, separate from the first CBF, may also be coded for the second square sub-block to indicate whether the second square sub-block includes at least one nonzero transform coefficient.

In some examples, a CBF is not generally coded for the rectangular chroma block, i.e., for the combination of the first and second square sub-blocks. In this manner, each square sub-block of the rectangular chroma block has its own indication, i.e., its own CBF, which is processed to determine whether the respective sub-block includes non-zero transform coefficients. Accordingly, there is no need to generate a CBF for the overall, rectangular chroma block.

In one specific example, if the chroma CU size is 8×16 and it is subdivided into 4 4×8 transform units (TU's), for each chroma component, a CBF will generally not be signaled at the 4×8 block level. Instead, the 4×8 (i.e., rectangular) chroma block may be further subdivided into two 4×4 (i.e., square) sub-blocks. In this example, a CBF is coded for each 4×4 block, but not for the 4×8 block.

JCT-VC is considering a new profile for 4:2:2 and 4:4:4 color formats. According to some proposals for the 4:2:2 format, the chroma components are downsampled by a factor of 2 in the horizontal direction compared with the luma component. There is no downsampling in the vertical direction.

This type of subsampling impacts the TU sizes. For example, consider a CU of size 16 (width)×16 (height). Consider that the residual quadtree subdivides the CU into 4 8×8 TUs for luma. Then, for chroma components, the size of the TUs is 4×8. If the maximum and minimum luma transform sizes are 32×32 and 4×4, respectively, then for 4:2:2 chroma components, 16×32, 8×16 and 4×8 transforms may be necessary. In extended chroma format software, rectangular transforms corresponding to these sizes may be used. This has an impact on hardware complexity. In hardware, each transform size is typically implemented as a separate block. Thus, addition of rectangular transforms increases hardware complexity. Furthermore, use of rectangular transforms of these sizes also necessitates changes to quantization (adjusting the QP by ±3).

Splitting a rectangular chroma block into square sub-blocks, as described above, may present some considerations for intra-coding of such sub-blocks. The techniques described in this disclosure also or alternatively may include, in some examples, intra coding samples corresponding to one square sub-block, e.g., a bottom square sub-block, of a rectangular chroma block based on reconstructed samples obtained from intra-coding the other square sub-block, e.g., a top square sub-block of the rectangular chroma block. In an example, a method of coding video data may include receiving a rectangular chroma block that includes a first square sub-block and a second square sub-block. In some examples, the rectangular chroma block may be a rectangular chroma block that is not transformed, i.e., an untransformed rectangular chroma block. In other examples, the rectangular chroma block may be a rectangular chroma block that is transformed, i.e., a rectangular chroma transform block. Similarly, in some examples, a square sub-block may be a square sub-block that is not transformed, i.e., an untransformed square sub-block. In other examples, a square sub-block may be a square sub-block that is transformed, i.e., a square transform sub-block. Accordingly, a rectangular chroma block may be a rectangular chroma block that is transformed or a rectangular chroma block that is not transformed. Similarly, a square sub-block may be a square sub-block that is transformed or a square sub-block that is not transformed. Additionally, other blocks may or may not be transformed. Accordingly, in some cases a transform may be skipped for various blocks.

A first block of chroma data may be reconstructed using a first block of intra-predicted chroma data and first residual data obtained from the first square sub-block. A second block of intra-predicted chroma data may be generated for the second square sub-block from reference samples of the reconstructed first block of chroma data. A second block of chroma data may be reconstructed using the second block of intra-predicted chroma data and second residual data from the second square sub-block.

In the case of HEVC intra-predictive RQT coding, the steps of 1) intra prediction and 2) transform-quantization-dequantization-inverse transform are interleaved. In the current disclosure, two examples are illustrated. In one example, a prediction module in a video encoder or video decoder may perform intra prediction on the rectangular chroma block for each rectangular leaf in the RQT structure, e.g., in an intra prediction module. Then, the video encoder may split the intra prediction residual into two square blocks and apply a square transform to each block. In another example, the video encoder may interleave the process of prediction and transform as in the case of the HEVC main profile. In this case, the rectangular leaf block is divided into two square chroma blocks (top and bottom).

An encoder performs intra prediction on the top square chroma sub-block to generate an intra-prediction block, i.e., a block of intra-predicted chroma data, and intra-prediction residual data representing a difference between pixels of the block of intra-predicted chroma data and pixels of the top square chroma sub-block. The intra prediction residual data undergoes transformation, quantization, inverse quantization and inverse transformation in the encoder. After inverse quantization and inverse transformation to reproduce the residual data, a summer may add the resulting residual data back to the intra prediction block to form a reconstructed top square sub-block of chroma data. Then, reconstructed samples from the top square sub-block (and/or other reconstructed samples) are used as intra-prediction samples to perform intra prediction for the bottom square sub-block. For example, a coder may generate an intra-predicted block of chroma data for the bottom square chroma sub-block using reference samples from the reconstructed top square chroma sub-block. Then, in one example, the video encoder generates residual data for the bottom square chroma sub-block, representing a difference between the bottom square chroma sub-block data and the intra-predicted block of chroma data generated for the bottom square sub-block. The encoder performs transformation, quantization, and entropy coding of the residual data for the bottom square sub-block, e.g., for use by a decoder. A video decoder decodes the top square sub-block, and uses the reconstructed pixel data from the top square sub-block as intra-prediction reference samples to generate the intra-predicted block for the bottom square sub-block at the decoder side, obtains residual data for the bottom square sub-block, and then reconstructs the bottom square sub-block by adding the intra-predicted block and the residual data.

Hence, in this intra-coding example, a video encoder may divide a rectangular chroma block into top and bottom square sub-blocks. The video encoder may select an intra-coding mode for the top square sub-block, and apply the intra-coding mode to generate an intra-predicted block of chroma data for the top square sub-block. The intra-predicted block of chroma data may be generated, for example, using intra-prediction reference samples from one or more blocks that are spatially adjacent to the top square sub-block, e.g., either as a left block or above block. The video encoder generates a block of residual data based on a difference between the original chroma data of the top square sub-block and the intra-predicted block of chroma data. The video encoder transforms the block of residual data for the top square sub-block into transform coefficients and quantizes the transform coefficients representing the residual data. The video encoder entropy encodes the intra-coding mode information for the top square sub-block to permit the generation of the intra-predicted block of chroma data by the decoder and entropy encodes the quantized transform coefficients to permit the decoder to obtain the residual data.

At the encoder side, to intra-encode the bottom square sub-block using intra-prediction reference samples from the top square sub-block, the video encoder inverse quantizes and inverse transforms the transform coefficients to obtain the residual data for the top square sub-block of chroma data, generates the intra-predicted block of chroma data for the top square sub-block of chroma data, and then reconstructs the top square block of chroma data by adding the residual data to the intra-predicted block of chroma data. Some of the chroma data from the reconstructed top square sub-block can then be used as intra-prediction reference samples to intra-code the bottom square sub-block of chroma data.

For example, the encoder may select an intra-coding mode for the bottom square sub-block, and apply the intra-coding mode to generate an intra-predicted block of chroma data for the bottom square sub-block. The intra-predicted block of chroma data for the bottom square sub-block may be generated, for example, using reconstructed intra-prediction reference samples from the top square sub-block, and/or using intra-prediction reference samples from another spatially adjacent block such as a left adjacent block. If intra-prediction samples from the top square sub-block are used, the video encoder generates an intra-predictive block of chroma data for the bottom square sub-block based on intra-prediction samples from the top square sub-block.

The video encoder may generate a block of residual data based on a difference between the original chroma data of the bottom square sub-block and the intra-predicted block of chroma data for the bottom square sub-block. The video encoder may transform the block of residual data for the bottom square sub-block into transform coefficients and quantize the transform coefficients representing the residual data. The video encoder may entropy encode the intra-coding mode information for the bottom square sub-block to permit the generation of the intra-predicted block of chroma data for the bottom square sub-block by the decoder and entropy encodes the quantized transform coefficients to permit the decoder to obtain the residual data for the bottom square sub-block.

At the decoder side, a decoder receives the coded bitstream and obtains a rectangular chroma block that is divided into a top square sub-block and a bottom square sub-block. The decoder intra-decodes the top square sub-block. For example, the decoder generates an intra-predicted block of chroma data for the top square sub-block using references samples from one or more spatially adjacent blocks, inverse quantizes and inverse transforms the transform coefficients for the top square sub-block to produce residual data for the top square sub-block, and then reconstructs the top square sub-block of chroma data by summing the intra-predicted block of chroma data and the residual data. Then, the reconstructed top square sub-block can be used for intra-prediction of the bottom square sub-block.

For example, the video decoder may generate an intra-predicted block of chroma data for the bottom square sub-block using intra-prediction reference samples from the reconstructed top square sub-block of chroma data. The video decoder inverse quantizes and inverse transforms the transform coefficients for the bottom square sub-block to produce residual data for the bottom square sub-block, and then reconstructs the bottom square sub-block of chroma data by summing the intra-predicted block of chroma data and the residual data for the bottom square sub-block. In some examples, alternatively or additionally, the bottom square sub-block may be intra-predicted using reference samples from other spatially adjacent blocks, such as a left neighboring block, either alone or in combination with reference samples from the top square sub-block. In the manner described above, a top square sub-block may be used to intra-predict a bottom square sub-block of a rectangular chroma block.

Various aspects of a video coding process will now be described. In general, digital video devices implement video compression techniques to encode and decode digital video information more efficiently. Video compression techniques may be defined according to a video coding standard. Examples of video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions. In addition, there is a new video coding standard, namely High-Efficiency Video Coding (HEVC), being developed by the Joint Collaboration Team on Video Coding (JCT-VC) of ITU-T Video Coding Experts Group (VCEG) and ISO/IEC Motion Picture Experts Group (MPEG).

HEVC standardization efforts are based on a model of a video coding device referred to as the HEVC Test Model (HM). The HM presumes improvements in the capabilities of current video coding devices with respect to video coding devices available during the development of other previous video coding standards, e.g., ITU-T H.264/AVC. For example, whereas H.264 provides nine intra-prediction encoding modes, HEVC provides as many as thirty-five intra-prediction encoding modes.

The HEVC standard may also be referred to as ISO/IEC 23008-HEVC, which is intended to be the standard number for the delivered version of HEVC. Coding according to some of the presently proposed aspects of the developing HEVC standard will be described in this application for purposes of illustration. However, the techniques described in this disclosure may also be useful for and applied to other video coding processes, such as those defined according to ITU-T H.264 or other standard or proprietary video coding processes.

A typical video encoder operating according to a video coding standard, such as HEVC WD10, partitions each frame (i.e., picture) of an original video sequence into contiguous rectangular regions called "blocks" or "coding units." These blocks may be encoded by applying spatial (intra-frame) prediction and/or temporal (inter-frame) prediction techniques to reduce or remove redundancy inherent in video sequences. A spatial prediction may be referred to as an "intra mode" (I-mode), and a temporal prediction may be referred to as an "inter mode" (P-mode or B-mode). Prediction techniques generate a predictive block of video data. A block of original video data to be coded is compared to the predictive block.

The difference between the pixel values of the original block of video data and the pixel values of the predictive block may be referred to as residual data. Residual data may include residual data for the luma component and the chroma components. Residual data is typically an array of the difference between pixel values of a predictive block and the original block of video data. A transform, e.g., a discrete cosine transform (DCT), an integer transform, a wavelet transform, or a conceptually similar transform may be applied to the residual data during the coding process to generate a corresponding set of transform coefficients. Thus, the original block of video can be reconstructed by performing an inverse transform on the transform coefficients and adding the residual data to the predictive block. Transform coefficients may also be quantized. That is, the values of the transform coefficients may be represented as a bit string according to a defined bit-depth. In some cases, quantization may result in the representation of low value transform coefficients as zero. Quantized transform coefficients may be referred to as transform coefficient levels.

For video coding according to HEVC, as one example, a video frame may be partitioned into coding units. A coding unit (CU) generally refers to a rectangular image region that serves as a basic unit to which various coding tools are applied for video compression. A CU is typically square, and may be considered to be similar to a so-called "macroblock" described in other video coding standards such as, for example, ITU-T H.264. A CU may be considered an array of video sample values. Video sample values may also be referred to as picture elements, pixels, or pels. The size of a CU may be defined according to a number of horizontal and vertical samples. Thus, a CU may be described as an N×N or N×M CU.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

To achieve better coding efficiency, a CU may have variable sizes depending on video content. A CU usually has a luminance component, denoted as Y, and two chroma components, denoted as U and V. The two chroma components U and V may also be denoted by $C_b$ and $C_r$, respectively. Further, according to HEVC, syntax data within a bitstream may define a largest coding unit (LCU), which is a largest CU for a frame or picture in terms of the number of samples. The size of a CU is usually defined according to the number of horizontal and vertical luma samples. Typically, an LCU includes 64×64 luma samples. CUs of other dimensions may be generated by recursively partitioning an LCU into sub-CUs. Syntax data for a bitstream may define a maximum number of times an LCU may be split, referred to as CU depth. Accordingly, a bitstream may also define a smallest coding unit (SCU). Typically, an SCU includes 8×8 luma samples. Thus, in one example, four 32×32 CUs may be generated by partitioning a 64×64 LCU into four sub-CUs and each of the 32×32 CUs may be further partitioned into sixteen 8×8 CUs or, in another example, a 32×32 block (FIG. 1) may be partitioned into four 16×16 blocks (FIG. 2).

A video sampling format, which may also be referred to as a chroma format, or color sample format, may define the number of chroma samples included in a CU with respect to the number of luma samples included in a CU. Depending on the video sampling format for the chroma components, the size, in terms of number of samples, of the U and V components may be the same as or different from the size of the Y component. In the H.264/AVC and HEVC WD10 video coding standards, a value called chroma_format_idc is defined to indicate different sampling formats of the chroma components, relative to the luma component. Table 1 illustrates the relationship between values of chroma_format_idc and associated chroma formats.

TABLE 1 different chroma formats defined in H.264/AVC

| chroma_format_idc | chroma format | SubWidthC | SubHeightC |
|---|---|---|---|
| 0 | monochrome | — | — |
| 1 | 4:2:0 | 2 | 2 |
| 2 | 4:2:2 | 2 | 1 |
| 3 | 4:4:4 | 1 | 1 |

In Table 1, the variables SubWidthC and SubHeightC can be used to indicate the horizontal and vertical sampling rate ratio between the number of samples for the luma component and the number of samples for each chroma component. In the chroma formats described in Table 1, the two chroma components have the same sampling rate.

In the example of Table 1, for the 4:2:0 format, the sampling rate for the luma component is twice that of the chroma components for both the horizontal and vertical directions. As a result, for a coding unit formatted according to the 4:2:0 format, the width and height of an array of samples for the luma component are twice that of each array of samples for the chroma components. Similarly, for a coding unit formatted according to the 4:2:2 format, the width of an array of samples for the luma component is twice that of the width of an array of samples for each chroma component, but the height of the array of samples for the luma component is equal to the height of an array of samples for each chroma component. For a coding unit formatted according to the 4:4:4 format, an array of samples for the luma component has the same width and height as an array of samples for each chroma component.

Figure 2:
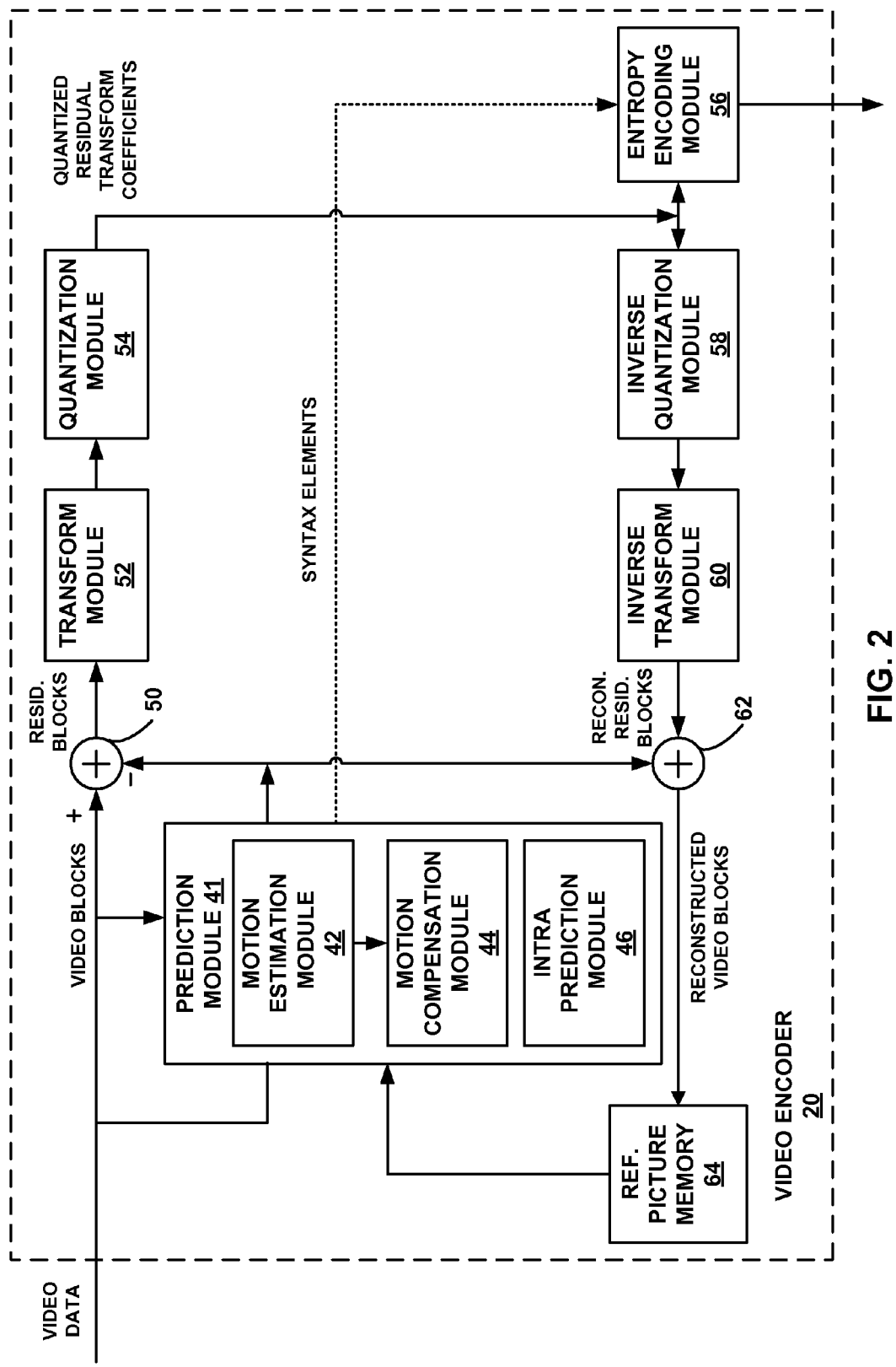
FIG. 2 is a block diagram illustrating an example video encoder that may implement the techniques described in this disclosure.
Figure 3:
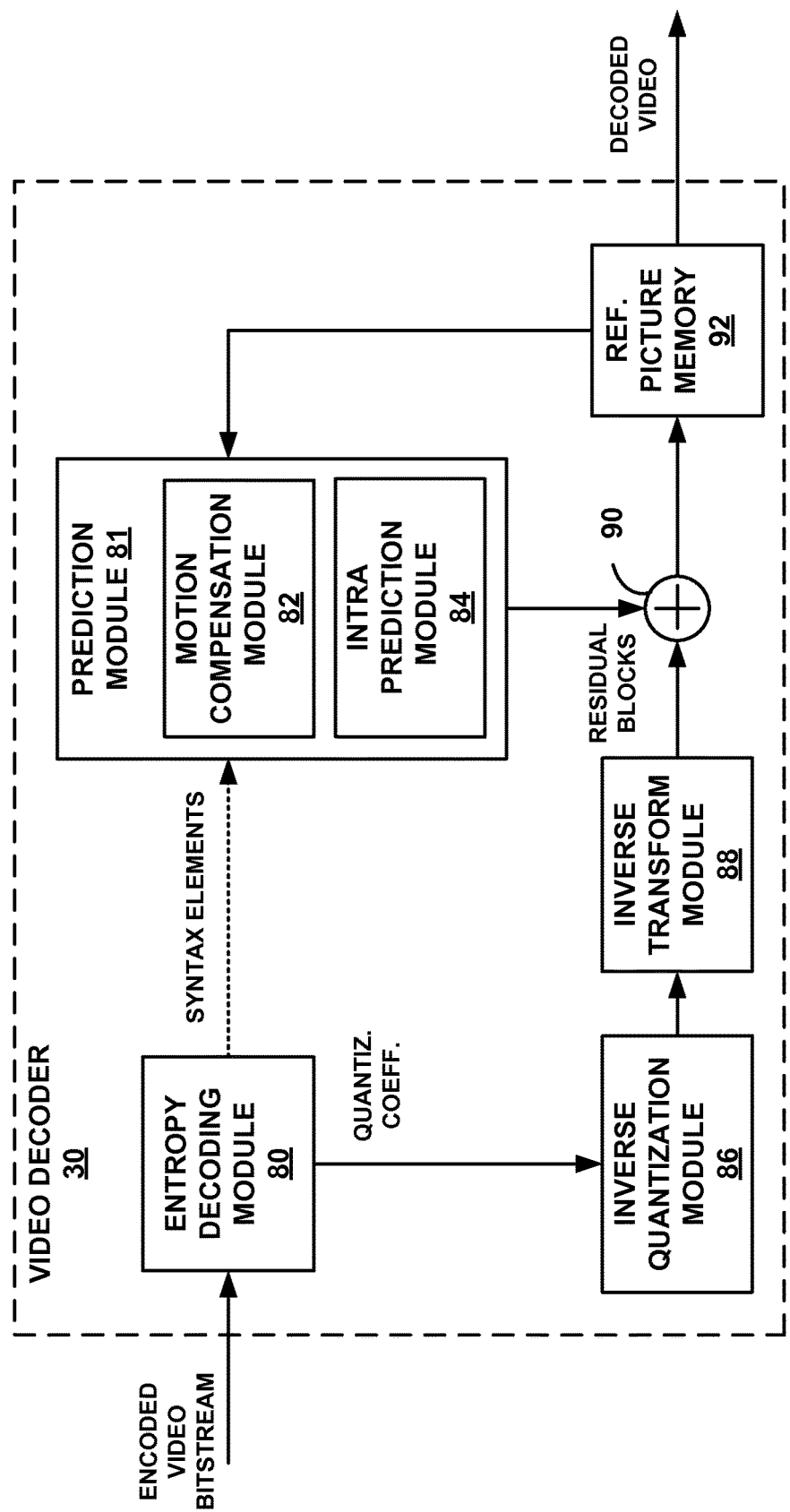
FIG. 3 is a block diagram illustrating an example video decoder that may implement the techniques described in this disclosure.

FIG. 1 is a block diagram illustrating an example video encoding and decoding system 10 that may utilize the techniques described in this disclosure. In particular, video coding system 10 may be configured to perform techniques for TU partitioning between samples of luma and chroma components when the 4:2:2 sample format is utilized. As illustrated in FIG. 3, system 10 includes a video encoder 20 that generates encoded video data to be decoded at a later time by a video decoder 30. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via a link 16. Link 16 may comprise any type of medium or device capable of moving the encoded video data from video encoder 20 to video decoder 30. In one example, link 16 may comprise a communication medium to enable video encoder 20 to transmit encoded video data directly to video decoder 30 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

Alternatively, encoded data may be output from output interface 22 to a storage device 34. Similarly, input interface 28 may access encoded data from storage device 34. Storage device 34 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 34 may correspond to a file server or another intermediate storage device that may hold the encoded video generated by video encoder 20. Destination device 14 may access stored video data from storage device 34 via streaming or download via input interface 28. The file server may be any type of server capable of storing encoded video data and transmitting that encoded video data to the video decoder 30. Example file servers include a web server (e.g., for a website), an FTP server, network attached storage (NAS) devices, or a local disk drive. Video decoder 30 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from storage device 34 may be a streaming transmission, a download transmission, or a combination of both.

The techniques of this disclosure are not necessarily limited to wireless applications or settings. The techniques may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes a video source 18, video encoder 20 and an output interface 22. In some cases, output interface 22 may include a modulator/demodulator (modem) and/or a transmitter. Video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if video source 18 is a video camera, source device 12 and destination device 14 may form so-called camera phones or video phones. However, the techniques described in this disclosure may be applicable to video coding in general, and may be applied to wireless and/or wired applications.

Video encoder 20 encodes the captured, pre-captured, or computer-generated video received from video source 18. The captured, pre-captured, or computer-generated video may be formatted according to any of the sample formats described above including the 4:2:0, 4:2:2 or 4:4:4 sample formats. Video encoder 20 may perform video coding on video formatted according to any of the 4:2:0, 4:2:2 or 4:4:4 sample formats. In some cases, video encoder 20 may up sample or down sample the captured, pre-captured, or computer-generated video as part of the coding process. For example, captured video may be formatted according to the 4:4:4 sample format, video encoder 20 may down sample captured video to the 4:2:2 format and perform video encoding on the down sampled video. The encoded video data may be transmitted directly to destination device 14 via output interface 22 of source device 12. The encoded video data may also (or alternatively) be stored onto storage device 34 for later access by destination device 14 or other devices, for decoding and/or playback.

Destination device 14 includes an input interface 28, a video decoder 30, and a display device 32. In some cases, input interface 28 may include a receiver and/or a modem. Input interface 28 of destination device 14 receives the encoded video data over link 16. The encoded video data communicated over link 16, or provided on storage device 34, may include a variety of syntax elements generated by video encoder 20 for use by a video decoder, such as video decoder 30, in decoding the video data. Such syntax elements may be included with the encoded video data transmitted on a communication medium, stored on a storage medium, or stored on a file server.

Display device 32 may be integrated with, or external to, destination device 14. In some examples, destination device 14 may include an integrated display device and also be configured to interface with an external display device. In other examples, destination device 14 may be a display device. In general, display device 32 displays the decoded video data to a user, and may comprise any of a variety of display devices such as a liquid crystal display (LCD), a plasma display, an organic light emitting diode (OLED) display, or another type of display device.

Video encoder 20 and video decoder 30 may operate according to a video compression standard, such as the High Efficiency Video Coding (HEVC) standard presently under development, and may generally conform to the current HEVC Test Model (HM) or a future HM.

Alternatively, video encoder 20 and video decoder 30 may operate according to other proprietary or industry standards, such as the ITU-T H.264 standard, alternatively referred to as MPEG-4, Part 10, Advanced Video Coding (AVC), or revisions or extensions of such standards. The techniques of this disclosure, however, are not limited to any particular coding standard. Other examples of video compression standards include MPEG-2 and ITU-T H.263.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

As described above, in HEVC WD10, a video frame or picture may be divided into a sequence of treeblocks or largest coding units (LCU) that include both luma and chroma samples. LCUs may be recursively split into CUs that include associated PUs and TUs. In some examples, the size of a CU may range from 8×8 samples up to the size of the treeblock with a maximum of 64×64 samples or greater. Further, in HEVC WD10, a video frame or picture may be partitioned into one or more slices, where a slice includes a number of consecutive LCUs in coding order. A video frame may be partitioned into slices based on coding modes associated with CUs included in a slice. For example, a slice may be defined such that all CUs included in the slice share a common coding mode, such as: skip mode, direct mode, intra-prediction mode, or inter-prediction mode.

A series of video frames or pictures may be coded as part of a coded video sequence of group of pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. As described herein, video encoder 20 typically operates on video blocks within individual video slices in order to encode the video data. However, video encoder 20 may also perform higher level video coding processes, such as partitioning a video frame into slices and/or generating GOP level or slice level syntax.

As described above, syntax data associated with CUs may describe the partitioning of a CU into one or more PUs. Syntax data associated with a CU may also describe, for example, partitioning of the CU into one or more TUs according to a quad-tree. In some examples, a PU or a TU can be square or non-square in shape. In general, a PU includes data related to the prediction process. For example, when the PU is intra-mode encoded, the PU may include data describing an intra-prediction mode for the PU. As another example, when the PU is inter-mode encoded, the PU may include data defining motion information for the PU. The data defining the motion information for a PU may describe, for example, a motion vector having a horizontal component, a vertical component, a resolution (e.g., one-quarter pixel precision or one-eighth pixel precision), a prediction direction indicating a reference picture list (e.g., List 0, List 1, or List C) for the motion vector, and a reference picture index indicating a reference picture to which the motion vector points within a reference picture list. Hence, a PU may be considered a basic unit for carrying information relating to the prediction process. In one example, video encoder 20 may be configured to encode video data according to the PU structures supported by the HEVC test model (HM).

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up," "Down," "Left," or "Right." Thus, for example, "2N×nU" refers to a 2N×2N CU that is partitioned horizontally with a 2N×0.5N PU on top and a 2N×1.5N PU on bottom.

As described above, a TU is the basic unit used for transform and quantization processes. A given CU having one or more PUs may also include one or more transform units (TUs). Further, in HEVC WD10 TUs may be sized based on the RQT partition. In other words, the RQT partition may define transform sizes and may be specified for a CU and may be independent of the PU partition in some examples, although this may not always be the case. In some examples, the TUs may be the same size or smaller than the PUs. In some examples, e.g., for inter mode, TUs may even be larger than PUs. In such a case, the size at which prediction is performed may be the same as the size at which transform is applied. In some examples, residual samples corresponding to a CU may be subdivided into smaller units using a quad-tree structure known as "residual quad tree" (RQT). The leaf nodes of the RQT may be referred to as transform units (TUs).

Following intra- or inter-prediction, video encoder 20 may calculate residual video data corresponding to the PU. The residual values comprise pixel difference values representing differences between the pixel values of the original block to be coded and the pixel values of the predictive block formed by intra- or inter-prediction. The residual video data in the prediction unit, i.e., the residual pixel difference values, may be transformed into transform coefficients according to TU structure to produce transform coefficients. Hence, the residual data may be transformed from the pixel domain to a transform domain. In some cases (e.g., transform-skip mode), the transform may be skipped.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context adaptive variable length coding (CAVLC), context adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

As described above, HEVC transform coefficient coding does not support the case when all coefficients are zero. HEVC is not designed to parse blocks that have only zero valued coefficients. Accordingly, HEVC may need to be able to skip blocks that have only zero valued coefficients. This may be accomplished by the use of the coded block flag (CBF) which is typically used to signal the presence or absence of non-zero coefficients. In some examples of this disclosure, video encoder 20 signals two CBFs for chroma sub-blocks, one CBF for each of two square chroma sub-blocks of transform coefficients, of a rectangular block, directly without sending a CBF flag for the rectangular block. Video decoder 30 may then receive two CBFs, one CBF for each of two square chroma sub-blocks. Video encoder 20 does not signal any CBF in the encoded bitstream (in this example) for the rectangular block, and therefore video decoder 30 will not receive any CBF for the rectangular chroma block in the encoded bitstream. More specifically, video encoder 20, within source device 12, may encode two CBFs, one CBF for each of two blocks, directly for each block, without encoding a CBF flag for a rectangular block. The CBF for the rectangular block would indicate that at least one of the sub-blocks includes non-zero coefficients. In some examples, with individual CBF's for each of the sub-blocks, however, a CBF for the rectangular block is not necessary. In other examples, however, the rectangular CBF may still be sent. If the rectangular CBF is zero, sending the CBFs for the square sub-blocks may be skipped. The CBFs may be stored onto storage device 34 for later access by destination device 14 or other devices, for decoding and/or playback. In another example, these CBFs may be encoded in a bitstream that is transmitted through output interface 22 via link 16 and/or recorded in an encoded bitstream storage on storage device 34. Video decoder 30 in destination device 14 may then receive the two CBFs from link 16 and/or storage device 34 at input interface 28. Video decoder 30 may then be decode the CBFs.

For example, video data may be coded by splitting a rectangular chroma block, e.g., generated according to a 4:2:2 color sample format, e.g., at a quadtree leaf into first and second square sub-blocks. A CBF may be coded for the first square sub-block to indicate whether the first square sub-block includes at least one nonzero transform coefficient. Another CBF may also be coded for the second square sub-block to indicate whether the second square sub-block includes at least one nonzero transform coefficient. In this example, a CBF is not generally coded for the rectangular chroma block, i.e., the combination of the first and second square sub-blocks for the chroma component.

In one specific example, if the chroma CU size is 8×16 and it is subdivided into four 4×8 transform units, for each chroma component, a CBF will generally not be signaled at the 4×8 block level. The 4×8 rectangular chroma block may be further subdivided into two 4×4 square sub-blocks. A CBF is coded for each 4×4 square chroma sub-block. In particular, video encoder 20 may encode CBF's for each of the sub-blocks, and video decoder 30 decodes the CBF's for each of the sub-blocks.

In another example, if the chroma CU size is 8×16 and it may be further subdivided into four 4×8 transform units, for each chroma component, one CBF flag may be signaled at the 8×16 level indicating whether any of the 4 4×8 transform blocks have non-zero coefficients. If any of the 4 4×8 transform blocks have non-zero coefficients, then for each 4×8 block, another CBF flag may be sent. One example retains this structure while only changing the way the CBF is signaled at the RQT leaf level. In the first example, when the rectangular block at the quadtree leaf is split into two square transform blocks, one CBF flag may be sent for each square transform block. Thus, in the above example, one CBF flag is sent for the 8×16 block and then for each 4×8 leaf block, two CBF flags are sent. In another example, for the leaf block, the CBF is signaled hierarchically. In that case, for each 4×8 leaf block one CBF flag is sent to signal whether any non-zero transform coefficients are present. If this flag is one, two additional CBF flags are sent, one for each square transform block. It should be noted that these two example approaches may be used even when the chroma CBFs are signaled directly (as for luma) or instead if the chroma CBFs are signaled hierarchically. In that case, only the CBFs for RQT leaf blocks are sent.

The chroma component may include first and second chroma components such as, e.g., Cr and Cb chroma components or U and V chroma components. Coding the first and second sub-blocks includes coding first and second square sub-blocks of a first rectangular chroma block and coding first and second square sub-blocks of a second rectangular chroma block.

In another example, however, CBFs may be coded hierarchically. In such an example of hierarchical coding of CBFs, video encoder 20 may send one CBF for an entire rectangular block. Such a rectangular block may be divided into two square blocks and video encoder 20 may send an additional CBF flag for each of the square blocks when the rectangular block CBF is non-zero. Video decoder 30 may receive one CBF for the entire rectangular block. Such a rectangular block may be divided into two square blocks and video decoder 30 may receive an additional CBF flag for each of the square blocks when the rectangular block CBF is non-zero.

More specifically, video encoder 20 of source device 12 may encode one CBF for an entire rectangular block. Such a rectangular block may be divided into two square blocks and video encoder 20 may encode an additional CBF for each of the square blocks when the rectangular block CBF is non-zero. The CBF may be stored onto storage device 34 for later access by destination device 14 or other devices, for decoding and/or playback. Alternatively, these CBFs may be transmitted through output interface 22 to link 16 and/or storage device 34. The CBFs may be received by input interface 28 of destination device 14 may receive the one CBF for the entire rectangular block and the additional CBF for each of the square blocks when the rectangular block CBF is non-zero. The additional CBFs will not be stored, transmitted, or received when the rectangular block CBF is zero.

Another example related to coding video data may include transmitting and/or receiving a rectangular chroma block. For example, output interface 22 of source device 12 may transmit a rectangular chroma block and input interface 28 of destination device 14 may receive a rectangular chroma block. More specifically, video encoder 20 of source device 12 may encode the rectangular chroma block and it may be transmitted through output interface 22 to link 16 and/or stored on storage device 34 for later retrieval by a decoder such as video decoder 30. The encoded rectangular chroma block may be received from the link 16 and/or storage device 34 at input interface 28 of destination device 14 and decoded by video decoder 30. The encoded video data may also (or alternatively) be stored onto storage device 34 for later access by destination device 14 or other devices, for decoding and/or playback.

In some examples of this disclosure, video decoder 30 may obtain a rectangular chroma block that is divided into a first square sub-block and a second square sub-block, as described above. Splitting a rectangular chroma block into square sub-blocks, as described above, may present some considerations for intra-coding of such sub-blocks. The techniques also or alternatively may include, in some examples, intra coding samples corresponding to one square sub-block of a rectangular chroma block based on reconstructed samples obtained from intra-coding the other square sub-block. The first block of intra-predicted chroma data may be reconstructed using a first block of intra-prediction samples and first residual data obtained from the first square sub-block. For example, after intra decoding the top block, video decoder 30 intra decodes the bottom sub-block by generating an intra-predictive block and a residual. The second block of intra-prediction samples may be generated from the first block of intra-predicted chroma data. The second block of intra-predicted chroma data may be reconstructed using the second block of intra-prediction samples and second residual data from the second square sub-block. For example, video decoder 30 may intra code the bottom block using reconstructed samples from the top block.

In the case of HEVC intra-predictive RQT coding, the steps of 1) intra prediction and 2) transform-quantization-dequantization-inverse transform are interleaved. According to the current disclosure, two examples are illustrated. In one example, for each rectangular leaf in the RQT structure, a prediction module of video encoder 20 or a prediction module of video decoder 30 may perform intra prediction on the rectangular block. Then, the prediction module may split the intra prediction residual into two square blocks and a square transform is applied to each block. In another example, the process of prediction and transform is interleaved as in the case of HEVC main profile, e.g., as described above. In this case, a prediction module of video encoder 20 or a prediction module of video decoder 30 may divide the rectangular leaf block into two square blocks (top and bottom) or obtain a rectangular leaf block that is divided into two square blocks. Prediction modules of video encoder 20 or video decoder 30 may perform intra prediction on the top square sub-block. For example, video encoder 20 may intra code the top sub-block by generating an intra-predictive block. The intra prediction residual undergoes transform, quantization, inverse quantization and inverse transform. A summer in video encoder 20 may add the resulting block back to the intra prediction block to form a reconstructed top square sub-block. Then, the reconstructed samples from the top block (as well as other reconstructed samples) are used to perform intra prediction for the bottom square sub-block. For example, video encoder 20 may intra code the bottom square sub-block using reconstructed samples from the top square sub-block. In another example, video decoder 30 may perform corresponding functions after decoding the top square sub-block. For example, video decoder 30 may reconstruct the intra-predicted top square sub-block and use reconstructed reference samples of the top square sub-block to generate intra-predicted chroma data for the bottom square sub-block. Video decoder 30 then may reconstruct the bottom square sub-block by adding residual data for the bottom square sub-block to the intra-predicted chroma data for the bottom square sub-block.

FIG. 2 is a block diagram illustrating an example video encoder 20 that may implement the techniques described in this disclosure. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based compression modes. Inter-modes, such as uni-directional prediction (P mode) or bi-prediction (B mode), may refer to any of several temporal-based compression modes.

In the example of FIG. 2, video encoder 20 includes a prediction module 41, reference picture memory 64, summer 50, transform module 52, quantization module 54, and entropy encoding module 56. Prediction module 41 includes motion estimation module 42, motion compensation module 44, and intra prediction module 46. For video block reconstruction, video encoder 20 also includes inverse quantization module 58, inverse transform module 60, and summer 62. A deblocking filter (not shown in FIG. 2) may also be included to filter block boundaries to remove blockiness artifacts from reconstructed video. If desired, the deblocking filter would typically filter the output of summer 62. Additional loop filters (in loop or post loop) may also be used in addition to the deblocking filter.

As shown in FIG. 2, video encoder 20 receives video data, and prediction module 41 partitions the data into video blocks. In some cases, prediction module 41 may partition video data based on a rate distortion analysis. Received video data may be formatted according to any of the sample formats described above. For example, video data may be formatted according to the 4:2:2 sample format. Partitioning may include partitioning video data into slices, tiles, or other larger units, as well as video block partitioning, e.g., according to a quadtree structure of LCUs and CUs.

Video encoder 20 generally illustrates the components that encode video blocks within a video slice to be encoded. The slice may be divided into multiple video blocks (and possibly into sets of video blocks referred to as tiles). Prediction module 41 may select one of a plurality of possible coding modes, such as one of a plurality of intra coding modes or one of a plurality of inter coding modes, for the current video block based on error results (e.g., coding rate and the level of distortion). Prediction module 41 may provide the resulting intra- or inter-coded block to summer 50 to generate residual block data and to summer 62 to reconstruct the encoded block for use as a reference picture.

Intra prediction module 46 within prediction module 41 may perform intra-predictive coding of the current video block relative to one or more neighboring blocks in the same frame or slice as the current block to be coded to provide spatial compression. Motion estimation module 42 and motion compensation module 44 within prediction module 41 perform inter-predictive coding of the current video block relative to one or more predictive blocks in one or more reference pictures to provide temporal compression.

Motion estimation module 42 may be configured to determine the inter-prediction mode for a video slice according to a predetermined pattern for a video sequence. The predetermined pattern may designate video slices in the sequence as P slices or B slices. Motion estimation module 42 and motion compensation module 44 may be highly integrated, but are illustrated separately for conceptual purposes. Motion estimation, performed by motion estimation module 42, is the process of generating motion vectors, which estimate motion for video blocks. A motion vector, for example, may indicate the displacement of a PU of a video block within a current video frame or picture relative to a predictive block within a reference picture.

A predictive block, for inter-coding, may be a block that is found to closely match the PU of the video block to be coded in terms of pixel difference, which may be determined by sum of absolute difference (SAD), sum of square difference (SSD), or other difference metrics. Alternatively, a predictive block, for intra-coding, may be a block that is formed based on spatial prediction with respect to pixel values from one or more neighboring blocks. In some examples, for inter-prediction, video encoder 20 may calculate values for sub-integer pixel positions of reference pictures stored in reference picture memory 64. For example, video encoder 20 may interpolate values of one-quarter pixel positions, one-eighth pixel positions, or other fractional pixel positions of the reference picture. Therefore, motion estimation module 42 may perform a motion search relative to the full pixel positions and fractional pixel positions and output a motion vector with fractional pixel precision.

Motion estimation module 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference picture memory 64. Motion estimation module 42 sends the calculated motion vector to entropy encoding module 56 and motion compensation module 44.

Motion compensation, performed by motion compensation module 44, may involve fetching or generating the predictive block based on the motion vector determined by motion estimation, possibly performing interpolations to sub-pixel precision. Upon receiving the motion vector for the PU of the current video block, motion compensation module 44 may locate the predictive block to which the motion vector points in one of the reference picture lists.

Video encoder 20 forms a residual video block, for inter or intra coding, by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation module 44 may also generate syntax elements associated with the video blocks and the video slice for use by video decoder 30 in decoding the video blocks of the video slice.

Intra-prediction module 46 may intra-predict a current block, as an alternative to the inter-prediction performed by motion estimation module 42 and motion compensation module 44, as described above. In particular, intra-prediction module 46 may determine an intra-prediction mode to use to encode a current block. In some examples, intra-prediction module 46 may encode a current block using various intra-prediction modes, e.g., during separate encoding passes, and intra-prediction module 46 (or mode select module 40, in some examples) may select an appropriate intra-prediction mode to use from the tested modes.

For example, intra-prediction module 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction module 46 may calculate ratios from the distortions and rates for the various encoded blocks to determine which intra-prediction mode exhibits the best rate-distortion value for the block. It should be noted that rate-distortion analysis may be performed on an combination of the color components.

In any case, after selecting an intra-prediction mode for a block, intra-prediction module 46 may provide information indicative of the selected intra-prediction mode for the block to entropy encoding module 56. Entropy encoding module 56 may encode the information indicating the selected intra-prediction mode in accordance with the techniques of this disclosure. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts. The bitstream may also (or alternatively) be stored onto storage device 34 for later access by destination device 14 or other devices, for decoding and/or playback.

After prediction module 41 generates the predictive block for the current video block via either inter prediction or intra prediction, video encoder 20 forms a residual video block by subtracting the predictive block from the current video block. The residual video data in the residual block may be included in one or more TUs and applied to transform module 52. Note that transform module 52 refers to a component, module or functional unit of video encoder 20, and should not be confused with a TU, which is a basic unit of data for the transform and quantization process. Transform module 52 transforms the residual video data into residual transform coefficients using a transform, such as a discrete cosine transform (DCT) or a conceptually similar transform. Transform module 52 may convert the residual video data from a pixel domain to a transform domain, such as a frequency domain. Transform module 52 may send the resulting transform coefficients to quantization module 54.

In some examples, CU's that are inter or intra coded produce square luma components and rectangular chroma components when the 4:2:2 format is used. Transform module 52 may generate square sub-blocks for the rectangular chroma TU's. Splitting a rectangular chroma block into square sub-blocks, as described above, may present some consideration for intra-coding of such sub-blocks. The techniques also or alternatively may include, in some examples, intra coding samples corresponding to one square sub-block of a rectangular chroma block based on reconstructed samples obtained from intra-coding the other square sub-block.

As described above, video encoder 20 may encode two CBFs, one CBF for each of two square sub-blocks of a rectangular chroma block of transform coefficients, directly without a CBF flag for the rectangular block. For example, entropy encoding module 56 within video encoder 20 may encode two CBFs, one CBF for each of two sub-blocks for a rectangular chroma component block, directly without encoding a CBF flag for a rectangular block. In some examples, transform module 52 may split a rectangular chroma block of transform coefficients, e.g., at a quadtree leaf, into first and second square sub-blocks. In examples that include an RQT module or RQT block, such a module or block may perform the splitting of a rectangular chroma block of transform coefficients into first and second square sub-blocks. Entropy encoding module 56, or another functional unit of video encoder 20, may encode a CBF as a syntax element for the first square sub-block to indicate whether the first square sub-block includes at least one nonzero transform coefficient. Entropy encoding module 56 may also encode a CBF as a syntax element for the second square sub-block to indicate whether the second square sub-block includes at least one nonzero transform coefficient. Entropy encoding module 56 generally does not encode a CBF for the rectangular chroma block, i.e., the combination of the first and second square sub-blocks. The CBF's may be provided in the encoded bitstream to indicate whether a given sub-block includes or does not include non-zero transform coefficients. If the CBF indicates that a sub-block does include non-zero transform coefficients, a video decoder 30 parses the sub-block to process the non-zero transform coefficients. Otherwise, if the CBF does not indicate that the sub-block includes non-zero transform coefficients, video decoder 30 may skip parsing of the sub-block for processing of transform coefficients.

In one specific example, if the chroma CU size is 8×16 and it is subdivided into 4 4×8 transform units, for each chroma component, the entropy encoding module 56 will generally not encode a CBF and a CBF will generally not be signaled at the 4×8 block level. The 4×8 block may be further subdivided into two 4×4 sub-blocks. The entropy encoding module 56 may encode a CBF for each 4×4 block. In one example, the chroma component may include first and second chroma components, e.g., Cb and Cr or U and V. Coding the first and second sub-blocks includes coding first and second square sub-blocks of a first rectangular chroma block and coding first and second square sub-blocks of a second rectangular chroma block.

In another example, however, entropy encoding module 56 may encode CBFs hierarchically. In such an example of hierarchical encoding of CBFs, video encoder 20 of source device 12 may send one CBF for an entire rectangular block, e.g., entropy encoding module 56 may encode one CBF for an entire rectangular block. Such a rectangular block may be divided into two square blocks and source device 12 may send an additional CBF flag for each of the square blocks when the rectangular block CBF is non-zero, e.g., video encoder 20 may encode an additional CBF flag for each of the square blocks when the rectangular block CBF is non-zero.

Another example related to encoding video data may include transmitting a rectangular chroma block. For example, source device 12 may transmit a rectangular chroma block. More specifically, entropy encoding module 56 of video encoder 20 may encode the rectangular chroma block and it may be transmitted through output interface 22 to link 16. Alternatively, video encoder 20 may encode the rectangular chroma block and it may be stored in storage device 34, e.g., on some sort of storage media or memory. Generally many such rectangular chroma blocks would be stored using storage device 34, e.g., to form a complete picture or a complete series of pictures. The stored rectangular chroma block or blocks may later be read from storage device 34, e.g., off of what ever media the rectangular chroma block has been stored on. It will be understood that in some examples, a different storage device 34 may be used by source device 12 to store the rectangular chroma block from the storage device used to retrieve the rectangular chroma block by the destination device 14.

In some examples, video decoder 30 may divide a rectangular chroma block into a first square sub-block and a second square sub-block. Video decoder 30 intra decodes the top sub-block by generating an intra-predictive block and a residual. As described above, the first square sub-block of intra-predicted chroma data may be reconstructed using a first block of intra-predicted chroma data and first residual data obtained from the first square sub-block. For example, video decoder 30 may intra decode a bottom square sub-block of a rectangular chroma block using reconstructed samples from the top square sub-block as intra-prediction samples. The intra-predicted chroma data for the second square sub-block may be generated from reference samples obtained from the first square sub-block of chroma data. The second square sub-block of chroma data may be reconstructed using the second block of intra-predicted chroma data and second residual data from the second square sub-block.

Figure 8A:
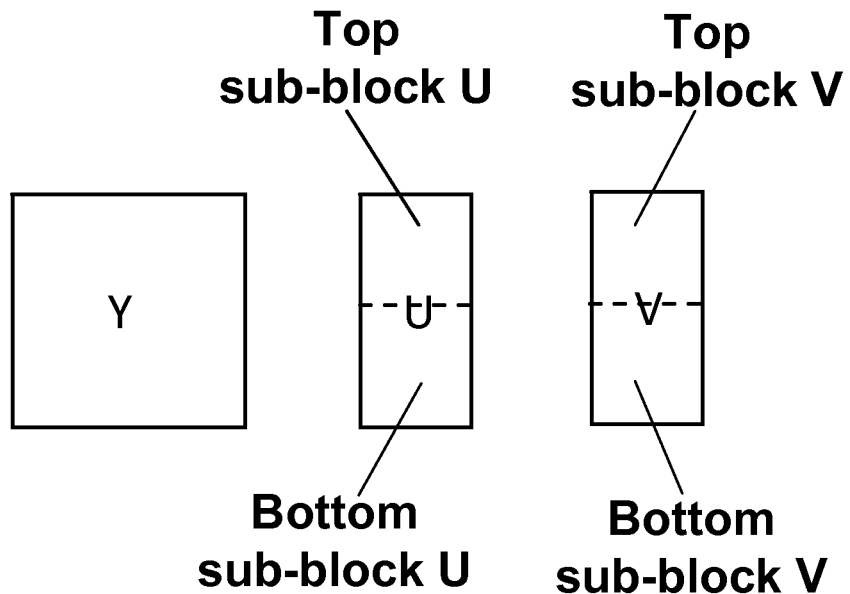
FIGS. 8A-8B are conceptual diagrams illustrating techniques for transform unit partitioning for a video block.

In some examples, the encoding of the first and second sub-blocks in video encoder 20 may include encoding first and second square sub-blocks of a first rectangular chroma block and decoding first and second square sub-blocks of a second rectangular chroma block. In some examples, the first sub-block may be a top sub-block and the second sub-block may be a bottom sub-block of the rectangular chroma block as illustrated in FIG. 8A. In some examples, the rectangular chroma block has a 4:2:2 sampling format as illustrated in FIGS. 4B and 5.

In some examples, a portion of video encoder 20, e.g., inverse quantization module 58 and/or inverse transform module 60 may decode video data. For example, video encoder 20 may, e.g., in inverse quantization module 58 and/or inverse transform module 60, receive a rectangular chroma block, wherein the rectangular chroma block is divided into a first square sub-block and a second square sub-block. Inverse quantization module 58 and/or inverse transform module 60 may reconstruct a first block of chroma data using a first block of intra-predicted chroma data and first residual data obtained from the first square sub-block. The reconstructed first block of chroma data may be stored in reference picture memory 64. Prediction module 41 may generate a second block of intra-predicted chroma data for the second sub-block based on reference samples obtained from the reconstructed first block of chroma data, and generate residual data based on differences between the second sub-block and the intra-predicted chroma data. Hence, the second sub-block is intra-predicted using intra-prediction reference samples from the econstruction first sub-block. Inverse quantization module 58 and/or inverse transform module 60 may reconstruct the second sub-block of chroma data using the second block of intra-predicted chroma data and second residual data from the second square sub-block, e.g., for storage in reference picture memory 64. In other examples, other parts of video encoder 20 may perform some or all of these functions.

In an example, video encoder 20, e.g., inverse quantization module 58 and/or inverse transform module 60, inverse quantizes transform coefficients of the first square sub-block, inverse transforms the inverse quantized transform coefficients to generate the first residual data, and adds the first residual data to the first block of intra-predicted chroma data to reconstruct the first block of chroma data. Video encoder 20, e.g., in prediction module 41, then intra-encodes the second square sub-block of chroma data using intra-prediction reference samples from the reconstructed first sub-block of chroma data.

In some examples, video encoder 20 may intra-encode the second square sub-block of chroma data using intra-prediction reference samples from an additional spatial neighboring block, e.g., such as a left neighboring block, either alone or in combination with intra-prediction reference samples from the reconstructed first square sub-block. As mentioned above, in some examples, the additional neighboring block may be a left neighboring block. In other examples, other neighboring blocks may be used.

FIG. 3 is a block diagram illustrating an example video decoder 30 that may implement the techniques described in this disclosure. In the example of FIG. 3, video decoder 30 includes an entropy decoding module 80, prediction module 81, inverse quantization module 86, inverse transformation module 88, summer 90, and reference picture memory 92. Prediction module 81 includes motion compensation module 82 and intra prediction module 84. Video decoder 30 may, in some examples, perform a decoding pass generally reciprocal to the encoding pass described with respect to video encoder 20 from FIG. 2.

During the decoding process, video decoder 30 receives an encoded video bitstream that represents video blocks of an encoded video slice and associated syntax elements from video encoder 20. Entropy decoding module 80 of video decoder 30 entropy decodes the bitstream to generate quantized coefficients, motion vectors, and other syntax elements. Entropy decoding module 80 forwards the motion vectors and other syntax elements to prediction module 81. Video decoder 30 may receive the syntax elements at the video slice level and/or the video block level.

When the video slice is coded as an intra-coded (I) slice, intra prediction module 84 of prediction module 81 may generate prediction data for a video block of the current video slice based on a signaled intra prediction mode and data from previously decoded blocks of the current frame or picture. When the video frame is coded as an inter-coded (i.e., B or P) slice, motion compensation module 82 of prediction module 81 produces predictive blocks for a video block of the current video slice based on the motion vectors and other syntax elements received from entropy decoding module 80. The predictive blocks may be produced from one of the reference pictures within one of the reference picture lists. Video decoder 30 may construct the reference frame lists, List 0 and List 1, using default construction techniques based on reference pictures stored in reference picture memory 92.

Motion compensation module 82 determines prediction information for a video block of the current video slice by parsing the motion vectors and other syntax elements, and uses the prediction information to produce the predictive blocks for the current video block being decoded. For example, motion compensation module 82 uses some of the received syntax elements to determine a prediction mode (e.g., one of a plurality of inter-prediction modes) used to code the video blocks of the video slice, an inter-prediction slice type (e.g., B slice or P slice), construction information for one or more of the reference picture lists for the slice, motion vectors for each inter-encoded video block of the slice, inter-prediction status for each inter-coded video block of the slice, and other information to decode the video blocks in the current video slice.

Motion compensation module 82 may also perform interpolation based on interpolation filters. Motion compensation module 82 may use interpolation filters as used by video encoder 20 during encoding of the video blocks to calculate interpolated values for sub-integer pixels of reference blocks. In this case, motion compensation module 82 may determine the interpolation filters used by video encoder 20 from the received syntax elements and use the interpolation filters to produce predictive blocks.

Inverse quantization module 86 inverse quantizes, i.e., de-quantizes, the quantized transform coefficients provided in the bitstream and decoded by entropy decoding module 80. The inverse quantization process may include use of a quantization parameter calculated by video encoder 20 for each video block in the video slice to determine a degree of quantization and, likewise, a degree of inverse quantization that should be applied.

Inverse transform module 88 receives transform coefficients and applies an inverse transform, e.g., an inverse DCT, an inverse integer transform, or a conceptually similar inverse transform process, to the transform coefficients in order to produce residual blocks in the pixel domain. In some examples, inverse transform module 88 may receive transform coefficients that were generated by a video encoder based on the transform unit partitioning techniques.

After motion compensation module 82 or intra prediction module 84 generates the predictive block for the current video block based on the motion vectors and other syntax elements, video decoder 30 forms a decoded video block by summing the residual blocks from inverse transform module 88 with the corresponding predictive blocks generated by motion compensation module 82. Summer 90 represents the component or components that perform this summation operation.

If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in reference picture memory 92, which stores reference pictures used for subsequent motion compensation. Reference picture memory 92 also stores decoded video for later presentation on a display device, such as display device 32 of FIG. 1.

As described above, video decoder 30 may decode two CBFs, including a first CBF for one square sub-block and a second CBF for a second square sub-block of a rectangular chroma block of transform coefficients. Hence, video decoder 30 may receive CBFs for the square sub-blocks directly without receiving a CBF flag for a rectangular block in which the sub-blocks reside. For example, entropy decoding module 80 within video decoder 30 may decode two CBFs, one CBF for each of two blocks, directly without a CBF flag for a rectangular block. As described above, in some examples, a module in video encoder 20, such as prediction module 41 may split a rectangular chroma block, e.g., at a quadtree leaf, into first and second square sub-blocks. Accordingly, video decoder 30 may receive CBFs and coefficients corresponding to two square subblocks. Entropy decoding module 80 may decode a CBF for the first square sub-block to indicate whether the first square sub-block includes at least one nonzero transform coefficient. Entropy decoding module 80 may also decode a CBF for the second square sub-block to indicate whether the second square sub-block includes at least one nonzero transform coefficient. Entropy decoding module 80 generally does not decode a CBF for the rectangular chroma block, i.e., the combination of the first and second square sub-blocks, as a CBF for the rectangular block is not received in this example.

In one specific example, if the chroma CU size is 8×16 and it is subdivided into 4 4×8 transform units, for each chroma component, entropy decoding module 80 will generally not decode a CBF, and a CBF will generally not be signaled, at the 4×8 rectangular block level. The 4×8 block may be further subdivided into two 4×4 square sub-blocks. The entropy decoding module 80 may decode a CBF for each 4×4 block. In one example, the chroma component include first and second chroma components. Decoding the first and second sub-blocks includes decoding first and second square sub-blocks of a first rectangular chroma block and decoding first and second square sub-blocks of a second rectangular chroma block. Typically, a CBF is used to signal the presence or absence of non-zero coefficients. In some examples of this disclosure, video encoder 20 signals two CBFs for chroma sub-blocks, one CBF for each of two square chroma sub-blocks of a rectangular block of transform coefficients, directly without sending a CBF flag for the rectangular block. Video decoder 30 may then receive two CBFs, one CBF for each of two square chroma sub-blocks. No CBF is signaled in the encoded bitstream by video encoder 20 (in this example) for the rectangular block, and therefore no CBF for the rectangular chroma block will be received in the encoded bitstream by video decoder 30. If the CBF indicates that a sub-block does include non-zero transform coefficients, a video decoder 30 parses the sub-block to process the non-zero transform coefficients. Otherwise, if the CBF does not indicate that the sub-block includes non-zero transform coefficients, video decoder 30 may skip parsing of the sub-block for processing of transform coefficients.

In another example, however, entropy decoding module 80 may decode CBFs hierarchically. In such an example of hierarchical decoding of CBFs, video decoder 30 of destination device 14 may receive one CBF for an entire rectangular block, e.g., entropy decoding module 80 may decode one CBF for an entire rectangular block. Such a rectangular block may have been divided into two square blocks, e.g., at a video encoder 20, and video encoder 20 of source device 12 may have sent an additional CBF flag for each of the square blocks when the rectangular block CBF is non-zero, e.g., entropy decoding module 80 may decode an additional CBF flag for each of the square blocks when the rectangular block CBF is non-zero. In this case, the CBF for the rectangular block indicates whether either of the sub-blocks includes non-zero coefficients. If so, then video decoder 30 receives CBF's of the individual sub-blocks, indicating whether each respective sub-block includes non-zero coefficients.

Video decoder 30 represents an example of a decoder configured to receive and process a rectangular chroma block that has been divided into a first square sub-block and a second square sub-block at, for example, video encoder 20. As described above, the first square sub-block of intra-predicted chroma data may be reconstructed using a first block of intra-predicted chroma data and first residual data obtained from the first square sub-block. A second block of intra-predicted chroma data for the second sub-block may be generated from the first block of intra-predicted chroma data. The second sub-block of chroma data may be reconstructed using the second block of intra-predicted chroma data and second residual data from the second square sub-block.

As discussed above, in some examples, video decoder 30 represents an example of a decoder configured to obtain a rectangular chroma block, e.g., at a quadtree leaf, that is into first and second square sub-blocks. Video decoder 30, e.g., entropy decoding module 80, may decode a first CBF for the first square sub-block to indicate whether the first square sub-block includes at least one nonzero transform coefficient. Entropy decoding module 80 in video decoder 30 may also decode a second CBF for the second square sub-block to indicate whether the second square sub-block includes at least one nonzero transform coefficient. As described herein, in some examples, video decoder 30 generally does not decode a CBF for the rectangular chroma block.

In some examples, the chroma component may include first and second chroma components. The decoding of the first and second square sub-blocks in video decoder 30 may include decoding first and second square sub-blocks of a first rectangular chroma block and decoding first and second square sub-blocks of a second rectangular chroma block. In some examples, the first sub-block may be a top square sub-block and the second sub-block may be a bottom square sub-block of the rectangular chroma block as illustrated in FIG. 8A. In some examples, the rectangular chroma block has a 4:2:2 sampling format as illustrated in FIGS. 4B and 5.

In some examples a portion of video decoder 30, e.g., entropy decoding module 80, may entropy decode video data. For example, entropy decoding module 80 may receive a rectangular chroma block, wherein the rectangular chroma block is divided into a first square sub-block and a second square sub-block. Prediction module 81 may reconstruct a first square sub-block of chroma data using a first block of intra-predicted chroma data and first residual data obtained from the first square sub-block. Prediction module 81 may generate a second block of intra-predicted chroma data for the second square sub-block based on reference samples in the reconstructed first square sub-block and reconstruct a second square sub-block of intra-predicted chroma data using the second block of intra-predicted chroma data and second residual data from the second square sub-block. In other examples, other parts of video decoder 30 may perform some or all of these functions. Hence, intra-predictive reference samples from the top square sub-block can be used to generate the intra-predicted block for the bottom square sub-block of a rectangular chroma block.

In an example, video decoder 30, e.g., inverse quantization module 86 and/or inverse transform module 88, inverse quantizes transform coefficients of the first square sub-block, and inverse transforms the inverse quantized transform coefficients to generate the first residual data. Summer 90 may add the first residual data to the first block of intra-predicted chroma data to reconstruct the first square sub-block of chroma data.

In some examples, video decoder 30 may reconstruct the second sub-block of chroma data by generating an intra-predicted block of chroma data using intra-prediction reference samples from an additional spatially neighboring block, either alone or in combination with intra-prediction reference samples from the first square sub-block, e.g., the top square sub-block. In some examples, the additional neighboring block may be a left neighboring block. In other examples, other neighboring blocks may be used.

Figure 4A:
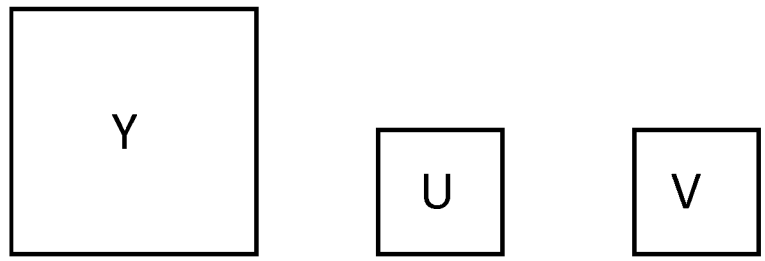
FIGS. 4A-4C are conceptual diagrams illustrating different color sample formats for luma and chroma components of a coding unit.
Figure 4B:
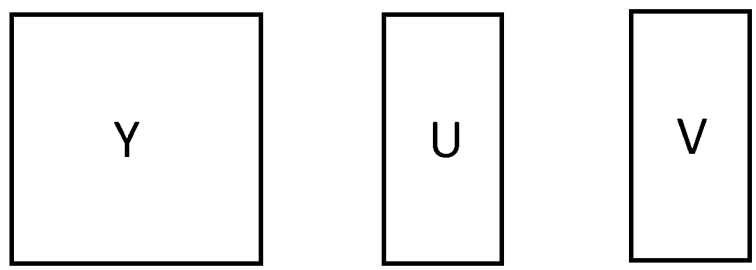
Figure 4C:
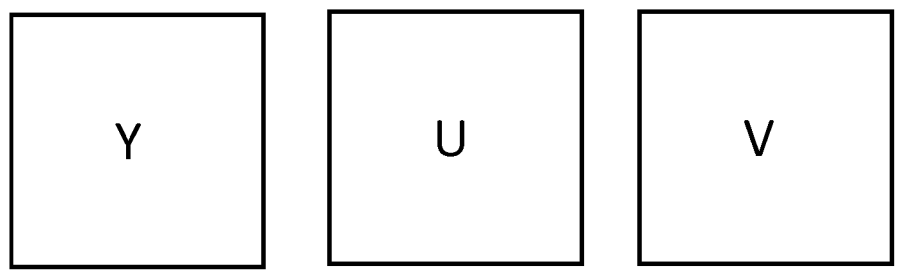
Figure 5:
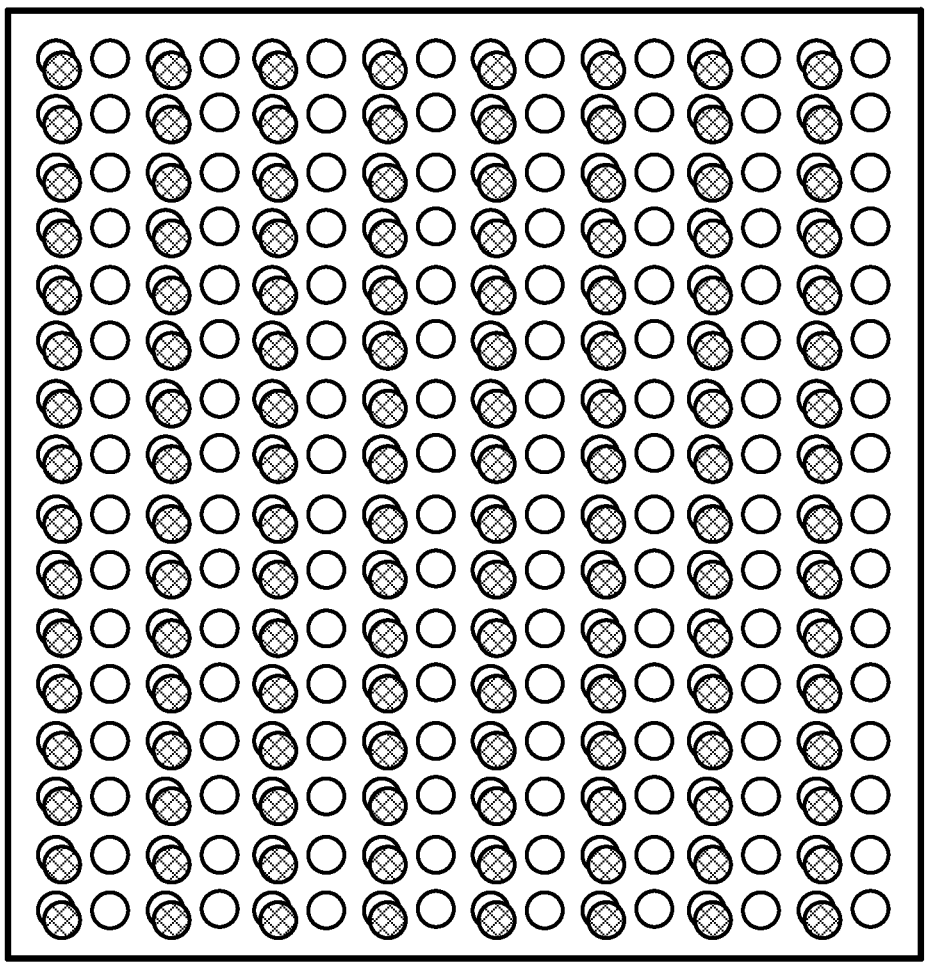
FIG. 5 is a conceptual diagram illustrating a 16×16 coding unit formatted according to a 4:2:2 color sample format.

FIGS. 4A-4C are conceptual diagrams illustrating different sample formats for luma and chroma components of a coding unit. FIG. 4A is a conceptual diagram illustrating the 4:2:0 sample format. As illustrated in FIG. 4A, for the 4:2:0 sample format, the chroma components are one quarter of the size of the luma component. Thus, for a CU formatted according to the 4:2:0 sample format, there are four luma samples for every sample of a chroma component. FIG. 4B is a conceptual diagram illustrating the 4:2:2 sample format. As illustrated in FIG. 4B, for the 4:2:2 sample format, the chroma components are one half of the size of the luma component. Thus, for a CU formatted according to the 4:2:2 sample format, there are two luma samples for every sample of a chroma component. FIG. 4C is a conceptual diagram illustrating the 4:4:4 sample format. As illustrated in FIG. 4C, for the 4:4:4 sample format, the chroma components are the same size of the luma component. Thus, for a CU formatted according to the 4:4:4 sample format, there is one luma sample for every sample of a chroma component.

FIG. 5 is a conceptual diagram illustrating an example of a 16×16 coding unit formatted according to a 4:2:2 sample format. As described above, a CU is typically defined according to the number of horizontal and vertical luma samples. Thus, as illustrated in FIG. 5, a 16×16 CU formatted according to the 4:2:2 sample format includes 16×16 samples of luma components and 8×16 samples for each chroma component. Further, as described above, a CU may be partitioned into smaller CUs. For example, the CU illustrated in FIG. 5 may be partitioned into four 8×8 CUs, where each CU includes 8×8 samples for the luma component and 4×8 samples for each chroma component.

Further, in some video coding standards, a coding unit may be partitioned into smaller units for purposes of prediction or transform. According to the HEVC, a CU may include one or more prediction units (PUs) and/or one or more transform units (TUs). This disclosure also uses the term "block," "partition," or "portion" to refer to any of a CU, PU, or TU. In general, "portion" may refer to any sub-set of a video frame. Further, this disclosure typically uses the term "video block" to refer to a coding node of a CU. In some specific cases, this disclosure may also use the term "video block" to refer to a treeblock, i.e., LCU, or a CU, which includes a coding node and PUs and TUs. Thus, a video block may correspond to a coding node within a CU and video blocks may have fixed or varying sizes, and may differ in size according to a specified coding standard.

A PU may represent all or a portion of the corresponding CU, and may include data for retrieving a reference sample for the PU. PUs may have square or rectangular shapes. For example, if the CU in FIG. 5 is coded using an inter-prediction, it may be divided into four rectangular PUs where each PU includes information identifying a set reference samples in a temporally adjacent frame. The sets of reference samples may be combined to form a predictive video block. As described above, the predictive video block may be subtracted from the CU to form residual data.

As described above, a transform may be applied to residual data to transform the residual data from a pixel domain to a transform domain. A transform block or TU may correspond to a set of residual data to which a transform is applied. TUs represent the size of a set of pixel difference values for purposes of performing transformation and generating a corresponding set of transform coefficients. The size of a TU may be the same as the size of a CU or a CU may be partitioned into a plurality of TUs. For example, on the CU illustrated in FIG. 5 a transform may be performed on the residual values associated with the 16×16 array of luma samples or a transform may be performed on each of four 8×8 arrays of luma samples. Larger TUs generally provide more compression with more perceivable "blockiness" in a reconstructed image, whereas smaller TUs generally provide less compression with less perceivable "blockiness." The selection of TU sizes may be based on rate-distortion optimization analysis.

Similar to an LCU, a TU may be recursively partitioned into smaller TUs. The TUs that result from partitioning a TUs into smaller TUs may be referred to as a transform block structure. An example of a transform block structure is the so-called tree structure. The tree structure may code a transform block as either being a whole TU or as being divided into a number of smaller TUs. This process can be done recursively for each block at every different decomposition level.

Figure 6:
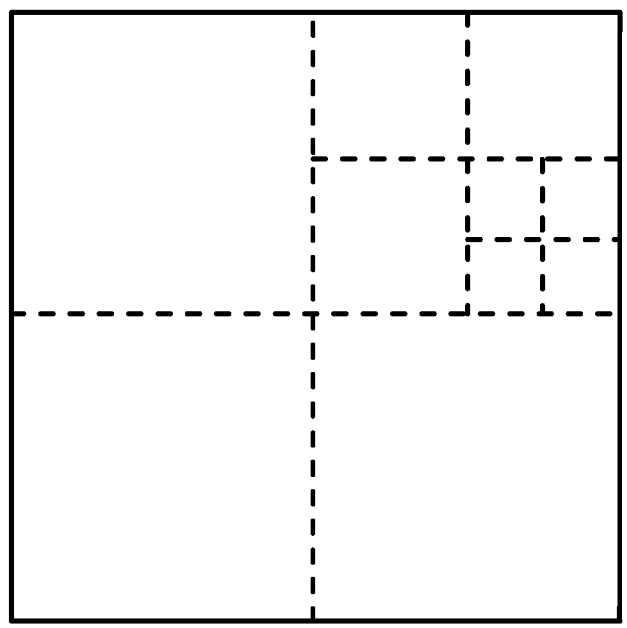
FIG. 6 is a conceptual diagram illustrating a quad-tree decomposition structure of a transform unit.

FIG. 6 is a conceptual diagram illustrating a quad-tree decomposition structure where a CU is either split or not split into four quarter-sized blocks at successive levels. In FIG. 6, the whole block may correspond to the original CU. The dashed lines indicate one outcome of transform block decomposition according to a quad-tree structure. It should be noted that decomposition illustrated in FIG. 6 is one of several possible decomposition outcomes. As illustrated in FIG. 6, there are three levels of transform decompositions. At the first level (i.e., level-1 decomposition), the whole transform block is split into four quarter-sized blocks. Then, at the second level (i.e., level-2), the second quarter-sized block is further split into four $\frac{1}{16}$ sized blocks. Then, at the third level (i.e., level-3), the fourth $\frac{1}{16}$ sized block is further split into four even smaller transform blocks. During the encoding process, a video encoder may determine whether a transform block should be further split based on rate-distortion optimization analysis.

The decomposition technique illustrated in FIG. 6 is referred as a quad-tree decomposition structure, in which case a block is either split or not split into four quarter-sized blocks. In FIG. 6, blocks are only split into square shape sub-blocks. However, in other decomposition techniques, such as those described in HEVC WD10, a block can also be split into rectangular shaped sub-blocks for transform purposes.

Figure 7:
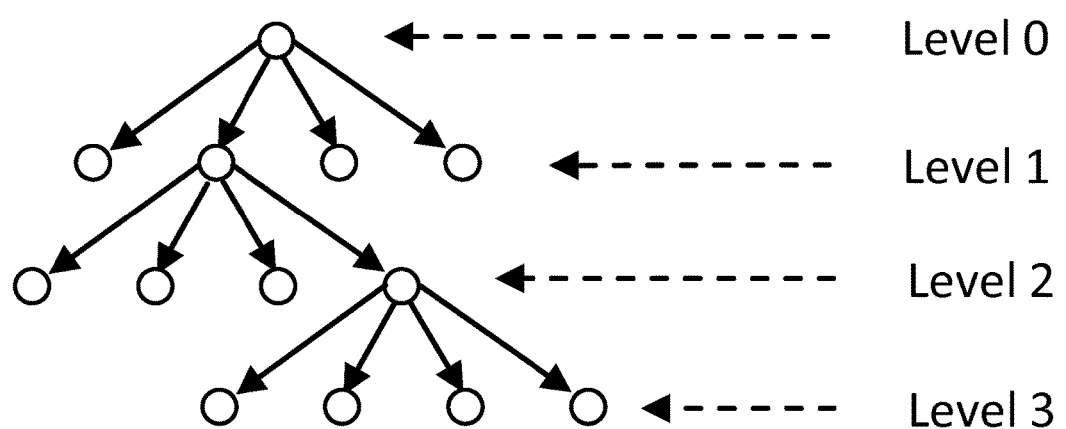
FIG. 7 is a conceptual diagram illustrating quad-tree decomposition levels.

FIG. 7 is a level diagram illustrating a quad-tree decomposition. FIG. 7 illustrates one example of a level diagram that may be used to signal the quad-tree decomposition illustrated in FIG. 6. Thus, FIG. 7 provides an alternative way of expressing a decomposition structure. As illustrated in FIG. 7, at different decomposition levels, a transform split flag can be signaled as follows:

Level 0: 1
Level 1: 0, 1, 0, 0
Level 2: 0, 0, 0, 1
Level 3: 0, 0, 0, 0

At level 0, which is the coding unit level, a flag of 1 is signaled because the transform is further split. At level 1, only the second quarter-sized block is further split, so flags of 0, 1, 0, 0 are sent in the encoded bitstream by the video encoder. At level 2, since other blocks are not further split, only the second quarter-sized block needs to be further signaled by a video encoder. In the second quarter-sized block, only the 4th block is to be further split, so flags of 0, 0, 0, 1 are sent at level 2 by the video encoder. At level 3, no block is to be further split, so flags of 0, 0, 0, 0 are sent. For clarification, it should be mentioned that in the present disclosure, a smaller level value means a higher level (i.e., a level closer to the root level) in the decomposition structure. As illustrated in FIG. 6 and FIG. 7, level 0 is the root level or top level.

Figure 8B:
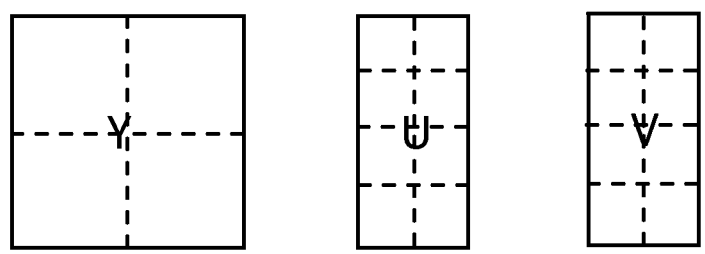

FIGS. 8A-8B illustrate different cases of transform unit partitioning for video blocks formatted according to the 4:2:2 sample format. In each of FIGS. 8A-8B, chroma components may be partitioned into top and bottom sub-blocks. In one example, first, a luma quadtree may be followed to divide the chroma components into rectangular blocks (e.g., for 4:2:2). Then, leaf chroma blocks may be divided into top and bottom square sub-blocks. By partitioning the rectangular blocks for the chroma components into top and bottom square sub-blocks, alternative TU shapes and sizes may be generated for the chroma components when compared to a case where the chroma components are not first partitioned into top and bottom sub-blocks. For example, square TU shapes might be generated such that square transforms may be used.

The video blocks in FIGS. 8A-8B may correspond to video blocks or CUs of any of the following sizes 4×4, 8×8, 16×16, 32×32, and 64×64. In general, by partitioning a chroma component into top and bottom sub-blocks, twice as many TUs are generated for the chroma component as compared to a case where the chroma component is not partitioned into top and bottom sub-blocks. Further, by partitioning a chroma component into top and bottom sub-blocks, TUs may be generated where a vertical or horizontal dimension of a TU is divided by two when compared to the case where the chroma component is not partitioned into top and bottom sub-blocks. Some specific cases of partitioning a CU into TUs when the chroma components are partitioned into top and bottom sub-blocks are described in detail below. It should be noted, however, that for the sake of brevity all possible TU partition combinations that may be derived from partitioning the chroma components into top and bottom sub-blocks have not been described in detailed, but the partitioning techniques described with respect to FIGS. 8A-8B may be applied at various levels of decomposition.

FIG. 8A illustrates example transform units based on a partitioning structure where the chroma components are partitioned into top and bottom sub-blocks and no additional partitioning based on the luma component is applied. As illustrated in FIG. 8A, a luma block is not further split and each of the corresponding chroma blocks is partitioned into a top sub-block and a bottom sub-block of the rectangular chroma block. In the example illustrated in FIG. 8A, the determination to further partition the chroma components after the chroma blocks are partitioned into a top sub-block and a bottom sub-block of the rectangular chroma block may be based on the partitioning of the luma component. Thus, in the example illustrated in FIG. 8A, each of the chroma components may not be further split because the luma block is not further split.

In one example, the CU associated with the TU partitioning illustrated in FIG. 8A may be an 8×8 CU. In this case, the partitioning of the chroma components into top and bottom sub-blocks results in an 8×8 TU for the luma component and two 4×4 TUs for the chroma components. This case can be contrasted to a case where the chroma components are not partitioned into top and bottom sub-blocks, which would result in an 8×8 TU for the luma component and a 4×8 TU for the chroma components. As described above, a 4×4 TU may be defined for HEVC whereas a 4×8 TU may not be defined or available. Thus, the partitioning of the chroma components into top and bottom sub-blocks may result in more useful TU shapes and sizes.

Again, since HEVC transform coefficient coding does not support the case when all coefficients are zero; typically, a CBF is used to signal the presence or absence of non-zero coefficients. In HEVC, chroma CBFs may be hierarchically coded. In such an example of hierarchical coding of CBFs, one CBF flag may be sent for the entire rectangular block. Such a block may be divided into two square blocks and an additional CBF flag may be sent for each of the square blocks, e.g., only when the rectangular block CBF is non-zero.

In a separate example, if the chroma CU size is 8×16 and it is subdivided into four 4×8 transform units, for each chroma component, one CBF is signaled at the 4×8 block level. The 4×8 block may be further subdivided into two 4×4 blocks. The CBF signaled at the 4×8 block level indicates whether any of the 4×4 transform blocks have non-zero coefficients. If any of the 4×4 transform blocks have non-zero coefficients then, for each 4×4 block, another CBF is sent.

In general, the CU associated with the TU partitions illustrated in FIG. 8A may be described as an N by N CU. The partitioning of the chroma components into top and bottom sub-blocks results in two N/2 by N/2 TUs as opposed to one N/2 by N TU in the case where the chroma components are not partitioned into top and bottom sub-blocks, which may permit the use of square transforms to process the blocks. Thus, partitioning the chroma components into top and bottom sub-blocks results in two square TUs compared to one rectangular TU with an aspect ratio of 1 to 2 in the case where the chroma components are not split into top and bottom sub-blocks. As pointed out above, in this example, each of the chroma sub-blocks has the same aspect ratio as the luma block. It should be noted that in other examples, the techniques described with respect FIG. 8A may be applied to 4×4, 16×16, 32×32 or 64×64 CUs. For the sake of brevity, the corresponding luma and chroma TU sizes for possible CU sizes are not described in detail. As described herein, a coder may code CBFs for the top sub-block and the bottom sub-block. Additionally, as described herein, in another example, a coder may use a reconstructed top sub-block to generate intra-predictive samples for a bottom sub-block of the rectangular chroma block.

FIG. 8B illustrates example transform units based on a partitioning structure where quad-tree partitioning is applied and the chroma components are partitioned into top and bottom sub-blocks. As illustrated in FIG. 8B, a luma block is split into four square shaped sub-blocks for transform purposes. The corresponding chroma blocks are each partitioned into a top sub-block and a bottom sub-block, which are both square, and then each of the top and bottom sub-blocks are further partitioned into four square-shaped blocks with even smaller sizes. In general, the CU in FIG. 8B may be described as an N by N CU. The partitioning of the luma component results in four N/2 by N/2 TUs. The partitioning of the chroma components into top and bottom sub-blocks results in eight N/4 by N/4 TUs as opposed to four N/4 by N/2 TUs in the case where the chroma components are not partitioned into top and bottom sub-blocks. Thus, partitioning the chroma components into top and bottom sub-blocks results in eight square TUs compared to four rectangular TUs with an aspect ratio of 1 to 2 in the case where the TUs are not one split into top and bottom sub-blocks. It should be noted that the CU in FIG. 8B may be a 4×4, 8×8, 16×16, 32×32 or a 64×64 CU. In one example, the chroma component includes first and second chroma components, e.g., top and bottom. Coding the first and second sub-blocks includes coding first and second square sub-blocks of a first rectangular chroma block and coding first and second square sub-blocks of a second rectangular chroma block.

In one example method of coding video data video encoder 20 or video decoder 30 may split a rectangular chroma block, e.g., at a quadtree leaf, into first and second square sub-blocks as illustrated in FIG. 8B. Video encoder 20 or video decoder 30 may decode a first CBF for the first square sub-block to indicate whether the first square sub-block includes at least one nonzero transform coefficient. Video encoder 20 or video decoder 30 may also decode a second CBF for the second square sub-block to indicate whether the second square sub-block includes at least one nonzero transform coefficient. Video encoder 20 or video decoder 30 generally do not decode a CBF for the rectangular chroma block. In some examples, the first sub-block may be a top sub-block and the second sub-block may be a bottom sub-block of the rectangular chroma block. The rectangular chroma block has a 4:2:2 sampling format.

Figure 9:
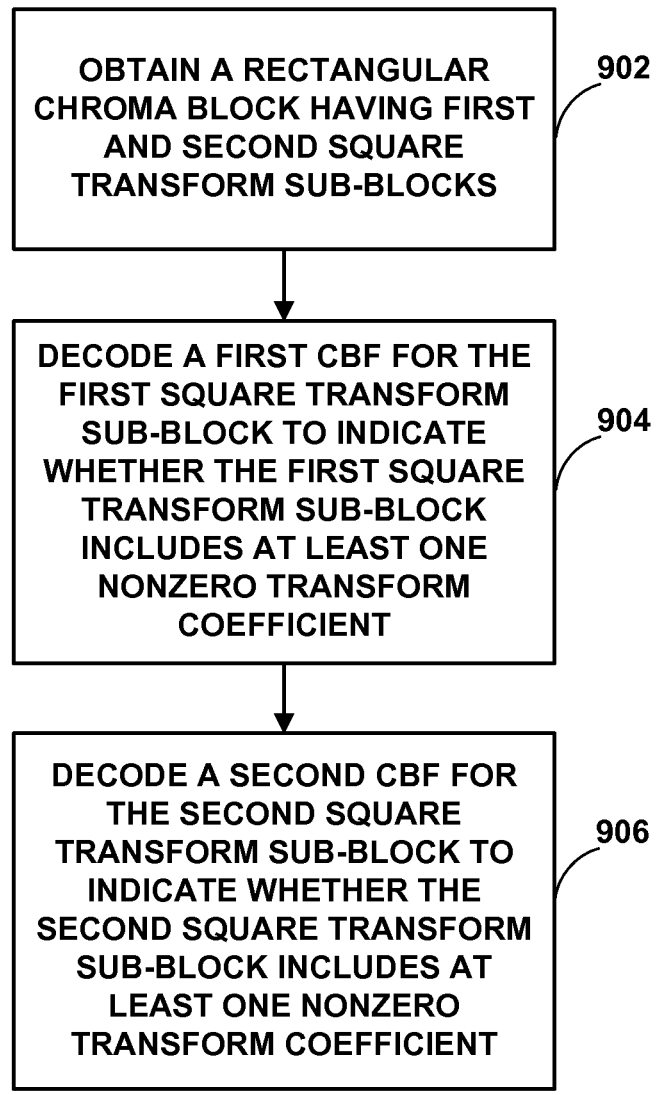
FIG. 9 is a flowchart illustrating an example method for decoding video data in accordance with the systems and methods described herein.

FIG. 9 is a flowchart illustrating an example method for decoding video data in accordance with the systems and methods described herein. In the example method of decoding video data illustrated in FIG. 9, a decoder such as video decoder 30 video data in which chroma data is arranged in a rectangular chroma block, with the first and second square sub-blocks together comprising a rectangular chroma block (902). For example, prediction module 81 of video decoder 30 obtains a rectangular chroma block, e.g., at a quadtree leaf, that is divided into first square sub-blocks and second square sub-blocks.

In some examples, the first sub-block comprises a top sub-block and the second sub-block comprises a bottom sub-block of the rectangular chroma block. Additionally, in some examples, the rectangular chroma block has a 4:2:2 sampling format.

The video decoder 30 codes a first coded block flag (CBF) for the first square sub-block to indicate whether the first square sub-block includes at least one nonzero transform coefficient (904). For example, entropy decoding module 80 of video decoder 30 may decode a first CBF for the first square sub-block to indicate whether the first square sub-block includes at least one nonzero transform coefficient.

Video decoder 30 also codes a second CBF for the second square sub-block to indicate whether the second square sub-block includes at least one nonzero transform coefficient (906), all while not coding a CBF for the rectangular chroma block, i.e., for the overall rectangular chroma block. For example, entropy decoding module 80 of video decoder 30 may decode a first CBF for the first square sub-block to indicate whether the first square sub-block includes at least one nonzero transform coefficient, and may decode a second CBF for the second square sub-block to indicate whether the second square sub-block includes at least one nonzero transform coefficient.

In some examples, the chroma component includes first and second chroma components, wherein decoding first and second sub-blocks comprises decoding first and second square sub-blocks of a first rectangular chroma block and decoding first and second square sub-blocks of a second rectangular chroma block. Video decoder 30, e.g., entropy decoding module 80, may decode a first CBF for the first square sub-block to indicate whether the first square sub-block includes at least one nonzero transform coefficient. Entropy decoding module 80 in video decoder 30 may also decode a second CBF for the second square sub-block to indicate whether the second square sub-block includes at least one nonzero transform coefficient. As described herein, in some examples, video decoder 30 generally does not decode a CBF for the rectangular chroma block.

Figure 10:
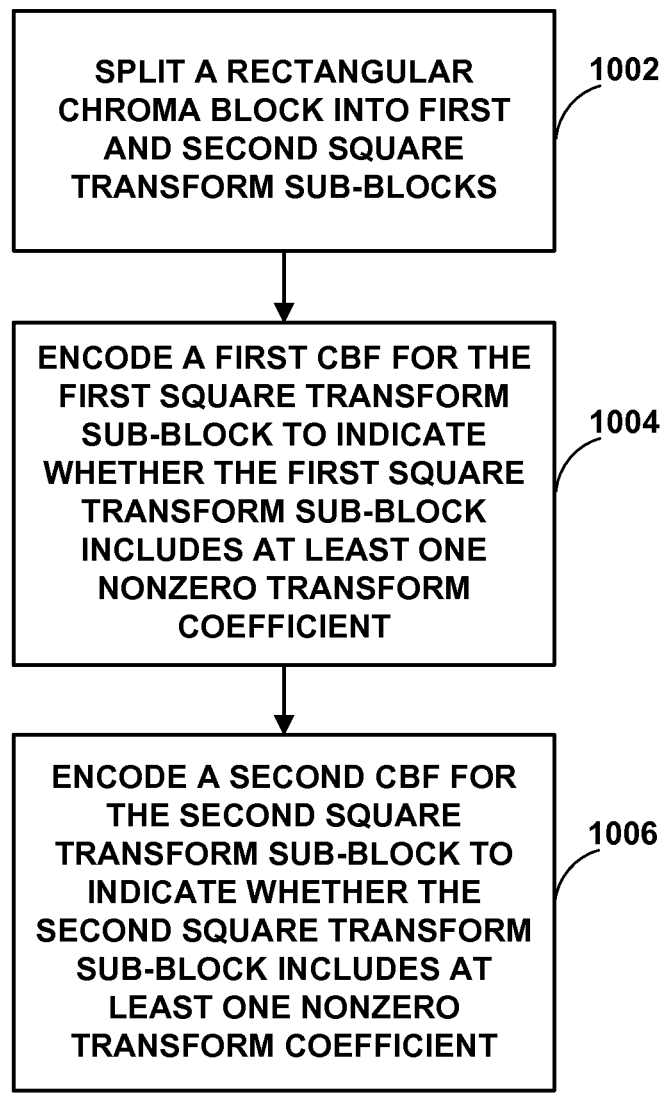
FIG. 10 is a flowchart illustrating another example method for encoding video data in accordance with the systems and methods described herein.

FIG. 10 is a flowchart illustrating an example method for encoding video data in accordance with the systems and methods described herein. In the example method of encoding video data illustrated in FIG. 10, an encoder such as a video encoder 20 splits a rectangular chroma block, e.g., at a quadtree leaf, into first square sub-blocks and second square sub-blocks (1002). For example, prediction module 41 of video encoder 20 splits a rectangular chroma block, e.g., at a quadtree leaf, into a first square sub-block and a second square sub-block.

In some examples, the first sub-block comprises a top sub-block and the second sub-block comprises a bottom sub-block of the rectangular chroma block. Additionally, in some examples, the first sub-block and the second sub-block comprise chroma blocks have a 4:2:2 sampling format.

The video encoder 20 codes a first coded block flag (CBF) for the first square sub-block to indicate whether the first square sub-block includes at least one nonzero transform coefficient (1004). For example, entropy encoding module 56 of video encoder 20 may encode a first CBF for the first square sub-block to indicate whether the first square sub-block includes at least one nonzero transform coefficient.

The video encoder 20 also encodes a second CBF for the second square sub-block to indicate whether the second square sub-block includes at least one nonzero transform coefficient (1006), all while not encoding a CBF for the rectangular chroma block. For example, entropy encoding module 56 of video encoder 20 may encode a second CBF for the second square sub-block to indicate whether the second square sub-block includes at least one nonzero transform coefficient.

Figure 11:
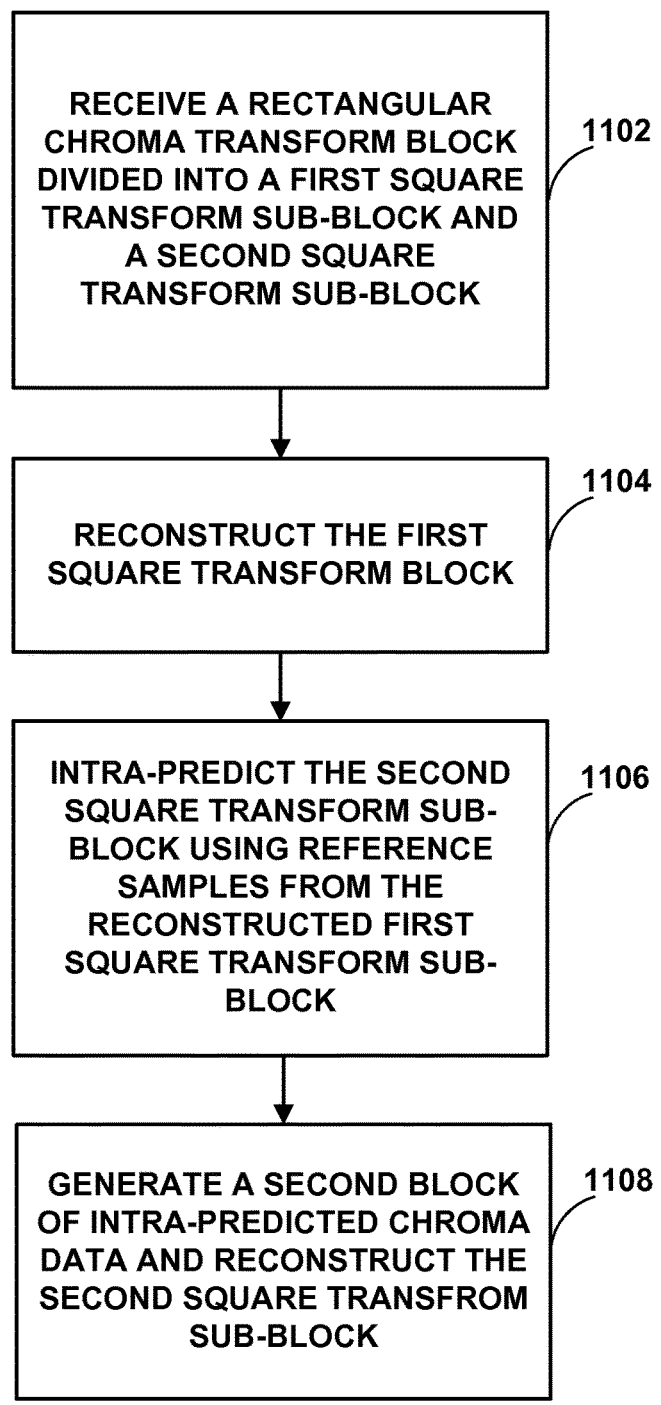
FIG. 11 is a flowchart illustrating an example method for decoding video data in accordance with the systems and methods described herein.

FIG. 11 is a flowchart illustrating an example method for decoding video data in accordance with the systems and methods described herein. In the example method of FIG. 11, a video decoder 30 receives a rectangular chroma block. The rectangular chroma block may be divided into a first square sub-block and a second square sub-block by video decoder 30 (1102). In an example, video decoder 30 receives a rectangular chroma block, with the rectangular chroma block divided into a first square sub-block and a second square sub-block. The first square sub-block may be a top square sub-block, and the second square transform block may be a bottom square sub-block, of the rectangular chroma block.

The video decoder 30 reconstructs a first square transform block (1104). In some examples, reconstructing the first square transform block may include using a first block of intra-predicted chroma data and first residual data obtained from the first square sub-block. In an example, video decoder 30 intra-decodes the first block, e.g, the top square sub-block, of intra-predicted chroma data using a first block of intra-predicted video data and first residual data obtained from the first square sub-block.

The video decoder 30 intra-predict the second square sub-block using reference samples from the reconstructed first square sub-block (1106). Intra-predicitng the second square sub-block may include generating a second block of intra-predicted chroma data using reference samples from the reconstructed first square sub-block and reconstructing the second square transform sub-block using the second block of intra-predicted chroma data and second residual data for the second square sub-block (1108).

The video decoder 30 may reconstruct the second square sub-block using the second block of intra-predicted chroma data and second residual data from the second square sub-block. For example, video decoder 30 may reconstruct a second block, e.g., the bottom square sub-block, of chroma data using the second block of intra-predicted chroma data and second residual data from the second square sub-block.

In some examples, the video decoder may inverse quantize transform coefficients of the first square sub-block, inverse transform the inverse quantized transform coefficients to generate the first residual data, and add the first residual data to a first block of intra-predicted chroma data to generate the first block of chroma data. The first block of intra-predicted chroma data for the first square sub-block may be generated using intra-prediction prediction samples from one or more spatially neighboring blocks. Intra-prediction reference samples from the first sub-block then can be used to intra-predict a block of chroma data for the second square sub-block.

In some examples, video decoder 30 may additionally or alternatively reconstruct the second block of chroma data, e.g., the bottom square sub-block, using intra-prediction samples from an additional neighboring block that is in addition to the block of intra-prediction samples provided by the first block of chroma data, e.g, the top square sub-block. Some intra-prediction modes may use pixel samples from a spatially adjacent top block (such as the top square sub-block in this example) above a block to be intra coded (such as the bottom square sub-block in this example, either alone or in combination with pixel samples from another spatially neighboring block, e.g, in various directional intra modess. In some examples, the additional neighboring block comprises a left neighboring block relative to the block to be coded, e.g., adjacent the bottom square sub-block of the chroma component.

Figure 12:
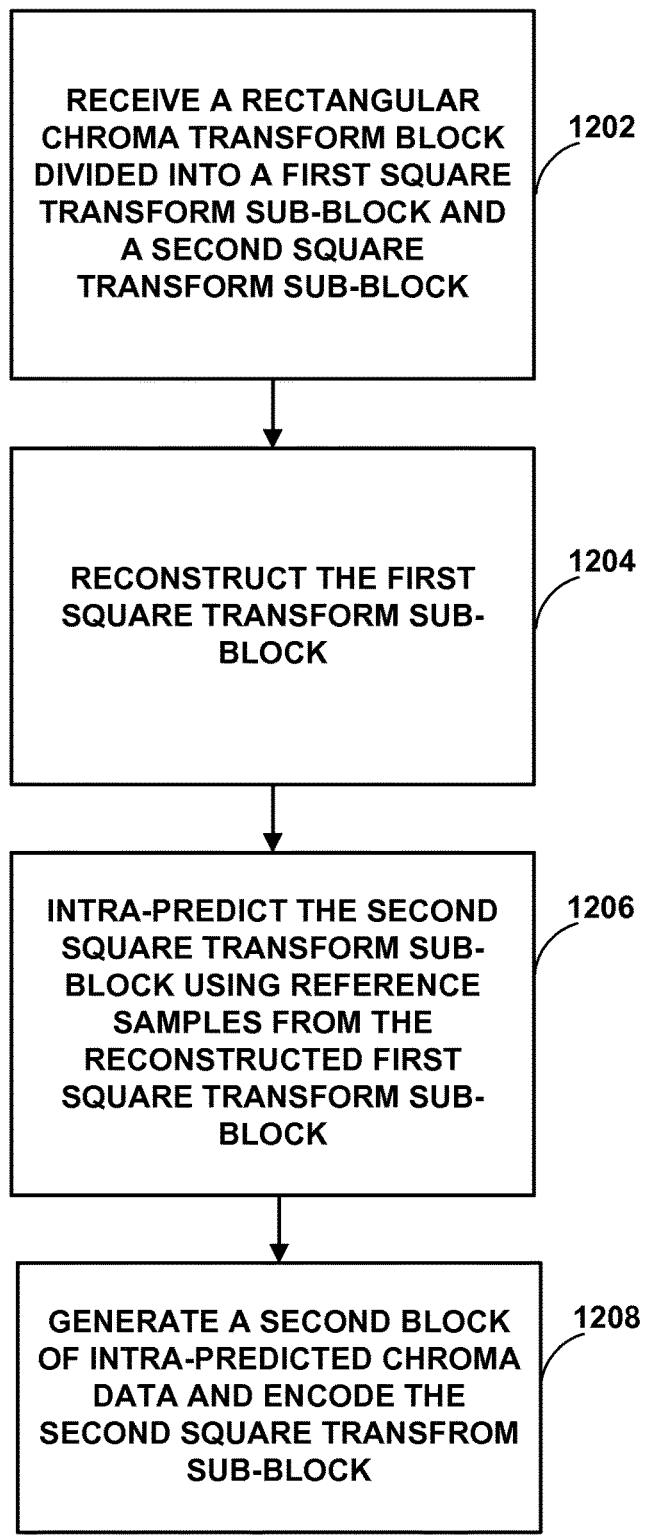
FIG. 12 is a flowchart illustrating an example method for encoding video data in accordance with the systems and methods described herein.

FIG. 12 is a flowchart illustrating an example method for encoding video data in accordance with the systems and methods described herein. In the example method of FIG. 12, a video encoder 20 receives a rectangular chroma block. The rectangular chroma block may be divided into a first square sub-block and a second square sub-block by the video encoder 20 (1202). For example, prediction module 41 of video encoder 20 may receive a rectangular chroma block, and divide the rectangular chroma block into a first square sub-block and a second square sub-block. The first square sub-block may be a top square sub-block, and the second square transform block may be a bottom square sub-block, of the rectangular chroma block.

The video encoder 20 reconstructs the first square transform block (1204). In some examples, reconstructing the first square transform block may include using a first block of intra-predicted chroma data and first residual data for the first square sub-block. For example, video encoder 20 intra-encodes the first block, e.g, the top square sub-block, and, upon reconstruction of the first block, uses the reconstructed data to intra-encode the second block, e.g, the bottom square sub-block. In particular, video encoder 20 may encode the first block by generating a block of intra-predicted chroma data and a block of residual data representing a difference between the pixel values of the intra-predicted chroma data and the pixel values of the first block. Video encoder 20 may transform the residual data into a block of transform coefficients and quantize the transform coefficients. Video encoder 20 may inverse quantize and inverse transform the coefficients to reconstruct the residual data, and then reconstruct the first square sub-block of chroma data by generating a first block of intra-predicted chroma data for the first square sub-block and adding the intra-predicted chroma data to the first residual data obtained from the first square sub-block. Video encoder 20 also entropy codes the residual data and intra-coding mode information for transmission to video decoder 30 in a coded video bitstream.

To intra-encode the second square sub-block (e.g., the bottom square sub-block), video encoder 20 uses intra-prediction reference samples from the first square sub-block to generate a block of intra-predicted chroma data, and then generates residual data indicating difference between the intra-predicted chroma data and the chroma data of the second square sub-block. Video encoder 20 then entropy codes the residual data and mode information and includes the entropy coded data in the encoded video bitstream for use by video decoder 30 in decoding operations. In this manner, chroma data from the reconstructed top square sub-block can be used as intra-prediction reference samples to intra-code the bottom square sub-block of chroma data.

The video encoder 20 intra-predict the second square sub-block using reference samples from the reconstructed first square sub-block (1206). Intra-predicitng the second square sub-block may include generating a second block of intra-predicted chroma data and second residual data for the second square sub-block based on intra-prediction samples in the first square sub-block; and encoding the second square transform sub-block using the second block of intra-predicted chroma data and the second residual data (1208).

Video encoder 20 may reconstruct a second block, e.g., the bottom square sub-block, of chroma data using the second block of intra-predicted chroma data and second residual data from the second square sub-block. In some examples, the video coder, e.g., in the reconstruction loop of video encoder 20 may inverse quantize transform coefficients of the first square sub-block, inverse transform the inverse quantized transform coefficients to generate the first residual data, and add the first residual data to a first block of intra-predicted chroma data to generate the first block of chroma data. The first block of intra-predicted chroma data for the first square sub-block may be generated using intra-prediction prediction samples from one or more spatially neighboring blocks. Intra-prediction reference samples from the first sub-block then can be used to intra-predict a block of chroma data for the second square sub-block.

In some examples, video encoder 20 may additionally or alternatively reconstruct the second block of chroma data, e.g., the bottom square sub-block, using intra-prediction samples from an additional neighboring block that is in addition to the block of intra-prediction samples provided by the first block of chroma data, e.g, the top square sub-block. Some intra-prediction modes may use pixel samples from a spatially adjacent top block (such as the top square sub-block in this example) above a block to be intra coded (such as the bottom square sub-block in this example, either alone or in combination with pixel samples from another spatially neighboring block, e.g, in various directional intra modess. In some examples, the additional neighboring block comprises a left neighboring block relative to the block to be coded, e.g., adjacent the bottom square sub-block of the chroma component.

Some examples include coding systems that provide for use of square transforms even in the case of 4:2:2 format video. The basic HEVC quadtree structure may be retained so that each rectangular block of a 4:2:2 chroma component may be split further into 4 rectangular blocks. For example, a 16×32 chroma block may be split into 4 8×16 blocks. Each of the 8×16 may be further subdivided into 4 4×8 blocks. At the leaf of the quadtree, that is, when the block is not split any further, the rectangular block for a 4:2:2 chroma component is split into 2 square blocks and a square transform is applied. For example, 2 8×8 transforms are used for a 8×16 leaf block. The QP selection process can be unchanged from the HEVC main profile. No adjustment to QP by ±3 is performed. The split rectangular block of an, e.g., 4:2:2 chroma component may be received, for example, at a video decoder. Accordingly, both a video encoder and a video decoder may operate on first square sub-blocks and second square sub-blocks. The video encoder may split a rectangular chroma block into the first and second square sub-blocks. The video decoder may receive these first and second square sub-blocks.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:
1. A method of decoding video data, the method comprising:
　　based on a chroma sampling format of a coding unit, determining, for a leaf node of the coding unit, that a non-square rectangular chroma block comprises a first square sub-block and a second square sub-block, wherein the leaf node of the coding unit corresponds to a node of a quadtree with no child nodes;
　　obtaining a first block of intra-predicted chroma data associated with the first square sub-block:
　　inverse quantizing transform coefficients associated with the first square sub-block;
　　inverse transforming the inverse quantized transform coefficients to generate first residual data
　　adding the first residual data to the first block of intra-predicted chroma data to reconstruct the first square sub-block;

intra-predicting the second square sub-block using reference samples from the reconstructed first square sub-block, wherein intra-predicting the second square sub-block comprises generating a second block of intra-predicted chroma data using reference samples from the reconstructed first square sub-block; and reconstructing the second square sub-block using the second block of intra-predicted chroma data and second residual data for the second square sub-block.

2. The method of claim 1, further comprising generating the second block of intra-predicted chroma data using intra-prediction samples of a neighboring block that is in addition to the reconstructed first square sub-block.

3. The method of claim 2, wherein the first square sub-block is a top block of the non-square rectangular chroma block and the second square sub-block is a bottom block of the non-square rectangular chroma block.

4. A method of encoding video data, the method comprising:

based on a chroma sampling format of a coding unit, determining that a leaf node of the coding unit comprises a non-square rectangular chroma block comprising a first square sub-block and a second square sub-block, wherein the leaf node of the coding unit corresponds to a node of a quadtree with no child nodes;

quantizing transform coefficients associated with the first square sub-block;

transforming the inverse quantized transform coefficients to generate first residual data; reconstructing reference samples for the first square sub-block based on the first residual data; and intra-predicting the second square sub-block using the reference samples for the reconstructed first square sub-block, wherein intra-predicting the second square sub-block comprises:

generating a second block of intra-predicted chroma data based on intra-prediction samples in the first square sub-block; and encoding, for the second square sub-block, second residual data.

5. The method of claim 4, further comprising encoding the second block of intra-predicted chroma data using other reference samples in addition to the reference sample of the reconstructed first square sub-block.

6. The method of claim 5, wherein the first square sub-block is a top block of the non-square rectangular chroma block and the second square sub-block is a bottom block of the non-square rectangular chroma block.

7. An apparatus for decoding video data comprising:
a memory configured to store video data; and
one or more processors configured to:
based on a chroma sampling format of a coding unit of the video data, determine, for a leaf node of the coding unit, that a non-square rectangular chroma block comprises a first square sub-block and a second square sub-block, wherein the leaf node of the coding unit corresponds to a node of a quadtree with no child nodes;
obtain a first block of intra predicted chroma data associated with the first square sub-block;
inverse quantize transform coefficients associated with the first square sub-block;
inverse transform the inverse quantized transform coefficients to generate first residual data add the first residual data to the first block of intra-predicted chroma data to reconstruct the first square sub-block;
intra-predict the second square sub-block using reference samples from the reconstructed first square sub-block, wherein to intra-predict the second square sub-block the one or more processors are configured to generate a second block of intra-predicted chroma data using reference samples from the reconstructed first square sub-block; and
reconstruct the second square sub-block using the second block of intra-predicted chroma data and second residual data for the second square sub-block.

8. The apparatus of claim 7, wherein the one or more processors are further configured to encode the second block of intra-predicted chroma data using other reference samples in addition to the reference samples of the reconstructed first square sub-block.

9. The apparatus of claim 8, wherein the first square sub-block is a top block of the non-square rectangular chroma block and the second square sub-block is a bottom block of the non-square rectangular chroma block.

10. An apparatus for decoding video data comprising:
means for determining, for a leaf node of the coding unit based on a chroma sampling format of a coding unit, that a non-square rectangular chroma block comprises a first square sub-block and a second square sub-block, wherein the leaf node of the coding unit corresponds to a node of a quadtree with no child nodes;
means for obtaining a first block of intra predicted chroma data associated with the first square sub-block;
means for inverse quantizing transform coefficients associated with the first square sub-block;
means for inverse transforming the inverse quantized transform coefficients to generate first residual data;
means for adding the first residual data to the first block of intra-predicted chroma data to reconstruct the first square sub-block;
means for intra-predicting the second square sub-block using reference samples from the reconstructed first square sub-block, wherein the means for intra-predicting the second square sub-block comprises means for generating a second block of intra-predicted chroma data using reference samples from the reconstructed first square sub-block; and
means for reconstructing the second square sub-block using the second block of intra-predicted chroma data and second residual data for the second square sub-block.

11. The apparatus of claim 10, further comprising means for generating the second block of intra-predicted chroma data using other reference samples in addition to the reference samples from the reconstructed first square sub-block.

12. The apparatus of claim 11, wherein the first square sub-block is a top block of the non-square rectangular chroma block and the second square sub-block is a bottom block of the non-square rectangular chroma block.

13. A non-transitory computer readable storage medium storing instructions that upon execution by one or more processors cause the one or more processors to:
based on a chroma sampling format of a coding unit, determine, for a leaf node of the coding unit, that a non-square rectangular chroma block comprising a first square sub-block and a second square sub-block, wherein the leaf node of the coding unit corresponds to a node of a quadtree with no child nodes;

obtain a first block of intra predicted chroma data associated with the first square sub-block;
inverse quantize transform coefficients associated with the first square sub-block;
inverse transform the inverse quantized transform coefficients to generate first residual data;
add the first residual data to the first block of intra-predicted chroma data to reconstruct the first square sub-block;
intra-predict the second square sub-block using reference samples from the reconstructed first square sub-block, wherein intra-predicting the second square sub-block comprises generating a second block of intra-predicted chroma data using reference samples from the reconstructed first square sub-block; and
reconstructing the second square sub-block using the second block of intra-predicted chroma data and second residual data for the second square sub-block.

\* \* \* \* \*